(12) United States Patent
Hagiwara et al.

(10) Patent No.: US 7,561,744 B2
(45) Date of Patent: Jul. 14, 2009

(54) IMAGE ENCODING APPARATUS, IMAGE DECODING APPARATUS, AND THEIR CONTROL METHOD, AND COMPUTER PROGRAM AND COMPUTER-READABLE STORAGE MEDIUM

(75) Inventors: Katsuyuki Hagiwara, Tokyo (JP); Kaname Tomiyasu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 724 days.

(21) Appl. No.: 10/992,760

(22) Filed: Nov. 22, 2004

(65) Prior Publication Data

US 2005/0152610 A1 Jul. 14, 2005

(30) Foreign Application Priority Data

Nov. 27, 2003 (JP) ............................. 2003-397824
Apr. 8, 2004 (JP) ............................. 2004-114361
Sep. 3, 2004 (JP) ............................. 2004-257423

(51) Int. Cl.
*G06K 9/46* (2006.01)

(52) U.S. Cl. .................................................... 382/232

(58) Field of Classification Search ................ 382/232, 382/237, 238, 239, 251, 252; 375/122, 240.01–240.29, 375/240; 345/555–559; 348/384.1–440.1; 358/426.01–426.16; 708/203
See application file for complete search history.

(56) References Cited

U.S. PATENT DOCUMENTS 5,007,102 A * 4/1991 Haskell ....................... 382/238
5,151,949 A * 9/1992 Miyata ........................ 382/176
5,883,976 A 3/1999 Ohsawa ....................... 382/232
5,912,706 A * 6/1999 Kikuchi et al. ........... 375/240.13
6,212,234 B1 * 4/2001 Andoh et al. ........... 375/240.08

(Continued)

FOREIGN PATENT DOCUMENTS

JP 5-56287 3/1993

(Continued)

*Primary Examiner*—Samir A. Ahmed
*Assistant Examiner*—Atiba O Fitzpatrick
(74) *Attorney, Agent, or Firm*—Fitzpatrick, Cella, Harper & Scinto

(57) ABSTRACT

This invention can generate encoded data of a high compression ratio of not only a halftone image but also a vertical stripe portion or text portion, which is weak in the conventional method, by a simple process or circuit scale, and can decode the encoded data on the decoding side by a simple process or circuit scale. To this end, image data is input from an input terminal (109). A reference pixel value storage unit (101) stores image data for one period of a dither matrix. A first prediction unit (102) calculates a predicted value of a pixel of interest with reference to threshold values less than one period of pixel values, which are stored in the reference pixel value storage unit (101). A second prediction unit (104) determines a pixel value one period before the pixel of interest as a predicted value. A continuity checking unit (105) compares first to third pixel values before the pixel of interest with three pixel values one period before the dither matrix, checks whether or not the number of matches is larger than the number of mismatches, and outputs the result to a predicted value selection unit (106). The predicted value selection unit selects one predicted value according to the checking result, and an encoding unit (107) encodes a difference between the selected predicted value and the pixel of interest.

22 Claims, 38 Drawing Sheets

U.S. PATENT DOCUMENTS

| | | | |
|---|---|---|---|
| 6,310,980 B1 * | 10/2001 | Kajiwara | 382/238 |
| 2001/0024524 A1 * | 9/2001 | So et al. | 382/238 |
| 2002/0031276 A1 * | 3/2002 | Yagishita et al. | 382/252 |
| 2003/0007697 A1 * | 1/2003 | Kadono | 382/247 |
| 2003/0107753 A1 | 6/2003 | Sakamoto | 358/1.9 |

FOREIGN PATENT DOCUMENTS

| | | |
|---|---|---|
| JP | 8-223428 | 8/1996 |
| JP | 2694826 | 12/1997 |
| JP | 2003-174561 | 6/2003 |

* cited by examiner

FIG. 3A

| 0 | 128 | 32 | 160 | 8 | 136 | 40 | 168 |
|---|---|---|---|---|---|---|---|
| 192 | 64 | 224 | 96 | 200 | 72 | 232 | 104 |
| 48 | 176 | 16 | 144 | 56 | 184 | 24 | 152 |
| 240 | 112 | 208 | 80 | 248 | 120 | 216 | 88 |
| 12 | 140 | 44 | 172 | 4 | 132 | 36 | 164 |
| 204 | 76 | 236 | 108 | 196 | 68 | 228 | 100 |
| 60 | 188 | 28 | 156 | 52 | 180 | 20 | 148 |
| 252 | 124 | 220 | 92 | 244 | 116 | 212 | 84 |

| 01 | 129 | 33 | 161 | 9 | 137 | 41 | 169 |
|---|---|---|---|---|---|---|---|
| 193 | 65 | 225 | 97 | 201 | 73 | 233 | 105 |
| 49 | 177 | 17 | 145 | 57 | 185 | 25 | 153 |
| 241 | 113 | 209 | 81 | 249 | 121 | 217 | 89 |
| 13 | 141 | 45 | 173 | 5 | 133 | 37 | 165 |
| 205 | 77 | 237 | 109 | 197 | 69 | 229 | 101 |
| 61 | 189 | 29 | 157 | 53 | 181 | 21 | 149 |
| 253 | 125 | 221 | 93 | 245 | 117 | 213 | 85 |

| 2 | 130 | 34 | 162 | 10 | 138 | 42 | 170 |
|---|---|---|---|---|---|---|---|
| 194 | 66 | 226 | 98 | 202 | 74 | 234 | 106 |
| 50 | 178 | 18 | 146 | 58 | 186 | 26 | 154 |
| 242 | 114 | 210 | 82 | 250 | 122 | 218 | 90 |
| 14 | 142 | 46 | 174 | 6 | 134 | 38 | 166 |
| 206 | 78 | 238 | 110 | 198 | 70 | 230 | 102 |
| 62 | 190 | 30 | 158 | 54 | 182 | 22 | 150 |
| 254 | 126 | 222 | 94 | 246 | 118 | 214 | 86 |

| REFERENCE PIXEL VALUE | $Th_i, Th_{i-1}$ | FIRST PREDICTED VALUE |
|---|---|---|
| 0 | — | 0 |
| 1 OR 2 | $Th_i > Th_{i-1}$ | 0 |
| | $Th_i \leq Th_{i-1}$ | 3 |
| 3 | — | 3 |

FIG. 7

| 1 | 2 | 5 | 6 | 17 | 18 | 21 | 22 |
|---|---|---|---|----|----|----|----|
| 3 | 4 | 7 | 8 | 19 | 20 | 23 | 24 |
| 9 | 10 | 13 | 14 | 25 | 26 | 29 | 30 |
| 11 | 12 | 15 | 16 | 27 | 28 | 31 | 32 |

FIG. 15

| 8 | 232 | 24 | 248 |
|---|---|---|---|
| 168 | 72 | 184 | 88 |
| 40 | 136 | 56 | 152 |
| 200 | 104 | 216 | 120 |

FIG. 16

| ORIGINAL IMAGE | 95 | 102 | 105 | 100 | 96 | 98 | 101 | 98 |
|---|---|---|---|---|---|---|---|---|
| | 101 | 97 | 98 | 96 | 103 | 97 | 101 | 96 |
| | 101 | 103 | 96 | 102 | 97 | 105 | 101 | 99 |
| | 103 | 97 | 97 | 103 | 102 | 98 | 97 | 104 |

| 1 | 0 | 1 | 0 | 1 | 0 | 1 | 0 |
|---|---|---|---|---|---|---|---|
| 0 | 1 | 0 | 1 | 0 | 1 | 0 | 1 |
| 1 | 0 | 1 | 0 | 1 | 0 | 1 | 0 |
| 0 | 0 | 0 | 0 | 0 | 0 | 0 | 0 |

FIG. 18

| (1,8) | (0,232) | (1,24) | (0,248) | (1,8) | (0,232) | (1,24) | (0,248) |
|---|---|---|---|---|---|---|---|
| (0,168) | (1,72) | (0,184) | (1,88) | (0,168) | (1,72) | (0,184) | (0,88) |
| (0,40) | (0,136) | (1,56) | (0,152) | (1,40) | (0,136) | (1,56) | (0,152) |
| (0,200) | (0,104) | (0,216) | (0,120) | (0,200) | (0,104) | (0,216) | (0,120) |

FIG. 19

| BINARIZATION RESULT | | BINARIZATION THRESHOLD VALUE | PREDICTED VALUE Y(i, j) |
|---|---|---|---|
| B(i−2, j) | B(i−1, j) | RELATION BETWEEN T((i−1) mod4, j mod4) AND T(i mod4, j mod4) | |
| 0 | 0 | NOT RELATED | 0 |
| 0 | 1 | T((i−1) mod4, j mod4) < T(i mod4, j mod4) | 0 |
| 0 | 1 | T((i−1) mod4, j mod4) ≥ T(i mod4, j mod4) | 1 |
| 1 | 0 | T((i−1) mod4, j mod4) < T(i mod4, j mod4) | 0 |
| 1 | 0 | T((i−1) mod4, j mod4) ≥ T(i mod4, j mod4) | 1 |
| 1 | 1 | NOT RELATED | 1 |

FIG. 20

| PREDICTED VALUE | 0 | 0 | 1 | 0 | 1 | 0 | 1 | 0 |
|---|---|---|---|---|---|---|---|---|
| | 0 | 0 | 0 | 1 | 0 | 1 | 0 | 1 |
| | 0 | 0 | 1 | 0 | 1 | 0 | 1 | 0 |
| | 0 | 0 | 0 | 0 | 0 | 0 | 0 | 0 |

FIG. 21

| DIFFERENCE | 1 | 0 | 0 | 0 | 0 | 0 | 0 | 0 |
|---|---|---|---|---|---|---|---|---|
| (HIT = 0) | 0 | 1 | 0 | 0 | 0 | 0 | 0 | 0 |
| (MISHIT = 1) | 1 | 0 | 0 | 0 | 0 | 0 | 0 | 0 |
| | 0 | 0 | 0 | 0 | 0 | 0 | 0 | 0 |

FIG. 26

| ATTRIBUTE | | CLASSIFICATION | | | | |
|---|---|---|---|---|---|---|
| TEXT | THRESHOLD VALUE RANGE | 127 OR LESS | | | 128 OR MORE | |
| | CLASS | CLASS 0 (REPRESENTATIVE THRESHOLD VALUE 64) | | | CLASS 1 (REPRESENTATIVE THRESHOLD VALUE 192) | |
| IMAGE | THRESHOLD VALUE RANGE | 95 OR LESS | 96 TO 159 (BOTH INCLUSIVE) | | | 160 OR MORE |
| | CLASS | CLASS 2 (REPRESENTATIVE THRESHOLD VALUE 48) | CLASS 3 (REPRESENTATIVE THRESHOLD VALUE 128) | | | CLASS 4 (REPRESENTATIVE THRESHOLD VALUE 208) |

F I G. 29

| INPUT PIXEL VALUE | DENSITY CLASS 0 | DENSITY CLASS 1 |
|---|---|---|
| 30 | 0 | 0 |
| 60 | 1 | 0 |
| 190 | 2 | 1 |
| 210 | 2 | 2 |

FIG. 30

| DENSITY CLASS OF REFERENCE PIXEL | DENSITY CLASS OF PIXEL TO BE PREDICTED | REFERENCE OUTPUT PIXEL VALUE | PREDICTED VALUE |
|---|---|---|---|
| 0 | 0 | 0 | 0 |
|  |  | 1 | 1 |
|  |  | 2 | 2 |
|  | 1 | 0 | 0 |
|  |  | 1 | 0 |
|  |  | 2 | 2 |
| 1 | 0 | 0 | 0 |
|  |  | 1 | 2 |
|  |  | 2 | 2 |
|  | 1 | 0 | 0 |
|  |  | 1 | 1 |
|  |  | 2 | 2 |

FIG. 32

| DENSITY CLASS OF REFERENCE PIXEL | DENSITY CLASS OF PIXEL TO BE PREDICTED | REFERENCE OUTPUT PIXEL VALUE | PREDICTED VALUE |
|---|---|---|---|
| 2 | 2 | 0 | 0 |
|   |   | 1 | 1 |
|   |   | 2 | 2 |
|   | 3 | 0 | 0 |
|   |   | 1 | 0 |
|   |   | 2 | 2 |
|   | 4 | 0 | 0 |
|   |   | 1 | 0 |
|   |   | 2 | 2 |
| 3 | 2 | 0 | 0 |
|   |   | 1 | 2 |
|   |   | 2 | 2 |
|   | 3 | 0 | 0 |
|   |   | 1 | 1 |
|   |   | 2 | 2 |
|   | 4 | 0 | 0 |
|   |   | 1 | 0 |
|   |   | 2 | 2 |
| 4 | 2 | 0 | 0 |
|   |   | 1 | 2 |
|   |   | 2 | 2 |
|   | 3 | 0 | 0 |
|   |   | 1 | 2 |
|   |   | 2 | 2 |
|   | 4 | 0 | 0 |
|   |   | 1 | 1 |
|   |   | 2 | 2 |

FIG. 33

| PREDICTED VALUE | DIFFERENCE | | | | |
|---|---|---|---|---|---|
| | −2 | −1 | 0 | +1 | +2 |
| 0 | | | A | B | C |
| 1 | | C | A | B | |
| 2 | C | B | A | | |

FIG. 34

| INTERMEDIATE CODE | OUTPUT CODE |
|---|---|
| A | 0 |
| B | 110 |
| C | 10 |
| RUN OF 8 "A"S | 1110 |
| RUN OF 10 "A"S | 11110 |
| RUN OF 12 "A"S | 111110 |
| RUN OF 14 "A"S | 1111110 |

FIG. 35

| INTERMEDIATE CODE | OUTPUT CODE |
|---|---|
| RUN OF 9 "A"S | 11100 |
| RUN OF 11 "A"S | 111100 |
| RUN OF 13 "A"S | 1111100 |
| RUN OF 15 "A"S | 11111100 |
| RUN OF 16 "A"S | 11101110 |

IMAGE ENCODING APPARATUS, IMAGE DECODING APPARATUS, AND THEIR CONTROL METHOD, AND COMPUTER PROGRAM AND COMPUTER-READABLE STORAGE MEDIUM

FIELD OF THE INVENTION

The present invention relates to encoding and decoding of image data.

BACKGROUND OF THE INVENTION

Upon compression-encoding image data, it is a common practice to compress data by exploiting the fact that neighboring pixel data are more likely to have an identical value.

As one of such compression methods, a runlength encoding technique is known. Runlength encoding encodes a runlength of identical data that runs and the data themselves. As another compression method, a method using delta row encoding is known. Delta row encoding encodes a runlength when data identical to that in the immediately previous line run. As still another compression method, prediction encoding is known. This prediction encoding calculates a predicted value of a pixel of interest from several neighboring pixels, e.g., left and upper pixels, and encodes a difference between the pixel value of interest and predicted value, i.e., a prediction error. In addition, various other compression methods which refer to neighboring pixels have been proposed.

When a grayscale image which is expressed by 8 bits (256 gray levels) per pixel is reduced to a grayscale image which is expressed by 4 bits (16 gray levels) per pixel, it is a common practice to reduce colors by performing a calculation process, using a dither matrix, based on different threshold values for respective pixels in each matrix. When color reduction is made using such dither matrix, even when neighboring pixel values in an original image are equal to each other, different threshold values are used in color reduction of neighboring pixels. Hence, neighboring pixel values after color reduction normally have different values, and a high compression ratio cannot be expected by the aforementioned method.

Since the dither matrix is applied repetitively, separate pixels (normally, pixels separated by a dither matrix period (size)) have high correlation in place of neighboring pixels. Therefore, in order to solve this problem, pixels which are separated by the dither matrix size need only be referred to in place of neighboring pixels.

As such color reduction process having periodicity, a halftone process is known in addition to the dither process. The halftone process is also an image processing method which determines output pixel values by comparing threshold values that repeat periodically with input pixel values.

In order to reduce this problem, a so-called interlaced process that rearranges scan lines in accordance with the dither matrix period is known. For example, when a 4×4 (pixel) dither matrix is used, scan lines are rearranged at intervals for four lines, so that pixels having high correlation align in the vertical direction. However, correlation cannot be improved in the horizontal direction, and an extra process, i.e., rearrangement, must be additionally done, resulting a long encoding processing time.

Furthermore, a technique for rearranging pixels in the horizontal direction in accordance with the dither matrix period is also known (e.g., Japanese Patent No. 2694826). However, according to this method, although pixels having high correlation are rearranged in the horizontal direction, correlation cannot be improved in the vertical direction, and an extra process, i.e., rearrangement, must be additionally done. In addition, since rearrangement for respective pixels must be done, if each pixel is expressed by less than 8 bits, an overhead is large if the process is done by a normal computer.

Moreover, a technique for referring to pixels having high correlation with reference to neighboring blocks without rearranging data is known (e.g., Japanese Patent Laid-Open No. 8-223428). However, according to this embodiment, vertical correlation cannot be utilized. Hence, a high compression ratio cannot be set for an image which has low horizontal correlation and high vertical correction, e.g., an image which has vertical stripes whose width is equal to the block width.

In addition, a prediction technique that uses the pixel values of a neighboring pixel group is known (e.g., Japanese Patent Laid-Open No. 2003-174561). However, upper pixels must be referred to so as to apply effective compression to the vertical stripe image, and a memory having a certain capacity is required.

In addition, various encoding methods such as LZ77 encoding, LZ78 encoding, JBIG encoding, JPEG encoding, and the like have been proposed. In either of these methods, encoding requires a large calculation volume, and also a considerably long period of time when an image is encoded by software. Also, when decoding is done by hardware, the circuit scale of a decoder increases.

SUMMARY OF THE INVENTION

The present invention has been made in consideration of the above situation, and has as its object to provide a technique which can compression-encode image data, which is quantized to a fewer number of gray levels using threshold values that change periodically in, e.g., a dither process or the like, by a simple process with less image deterioration.

It is another object of the present invention to provide a technique which can reduce the calculation volume upon decoding the aforementioned encoded data, and can reduce the circuit scale required to decode when decoding is implemented by hardware.

An image encoding apparatus according to the present invention that can achieve the above objects comprises the following arrangement.

That is, an image encoding apparatus for encoding image data, which is obtained by quantizing the number of gray levels per pixel of multi-valued image data into a fewer number of gray levels using threshold values which change at a predetermined period, comprises:

a first prediction unit, arranged to calculate a predicted value of a pixel of interest with reference to a neighboring pixel at a distance less than the predetermined period;

a second prediction unit, arranged to calculate, as a predicted value of the pixel of interest, a value of a pixel which is separated an integer multiple of the predetermined period from the pixel of interest;

a correlation calculation unit, arranged to calculate a correlation value between a predetermined number of neighboring pixels at distances less than the predetermined period from the pixel of interest, and pixels which are separated by the predetermined period and in phase with the neighboring pixels;

a selection unit, arranged to select the predicted value by the second prediction unit when the correlation value calculated by the correlation calculation unit is not less than a predetermined threshold value, and to select the predicted value by the first prediction unit when the correlation value is less than the predetermined threshold value; and an encoding unit, arranged to encode a value of the pixel of interest on the basis of the selected predicted value and the value of the pixel of interest.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3A to 3C show examples of dither matrices in an embodiment;

FIG. 4 shows the calculation conditions of a first predicted value in an embodiment;

FIG. 7 shows the pixel processing order in a block in the third embodiment;

FIG. 15 shows threshold values of a dither matrix in the first embodiment;

FIG. 16 shows an example of image data of an input multi-valued image;

FIG. 17 shows binary image data after a binarization process;

FIG. 18 shows pairs of output pixel values and threshold values, which are output from a threshold value comparison unit in FIG. 14;

FIG. 19 shows a condition table used to obtain a predicted value in the first embodiment;

FIG. 20 shows data indicating predicted values output from a predicted value calculation unit shown in FIG. 1;

FIG. 21 shows difference data between FIGS. 17 and 20;

FIG. 26 shows the relationship among the attributes, threshold values, and density classes in the second embodiment;

FIG. 29 shows an example of the input and output values of a text attribute in the second embodiment;

FIG. 30 shows predicted values of pixels of a text attribute in the second embodiment;

FIG. 32 shows predicted values of pixels of an image attribute in the second embodiment;

FIG. 33 shows the relationship between the predicted values and difference values, and intermediate codes in the second embodiment;

FIG. 34 shows the relationship between the intermediate codes and output codes in the second embodiment;

FIG. 35 shows an example of a code as a combination of two output codes in the second embodiment;

DETAILED DESCRIPTION OF THE PREFERRED EMBODIMENTS

Preferred embodiments of the present invention will be described in detail hereinafter with reference to the accompanying drawings.

First Embodiment

Figure 14:
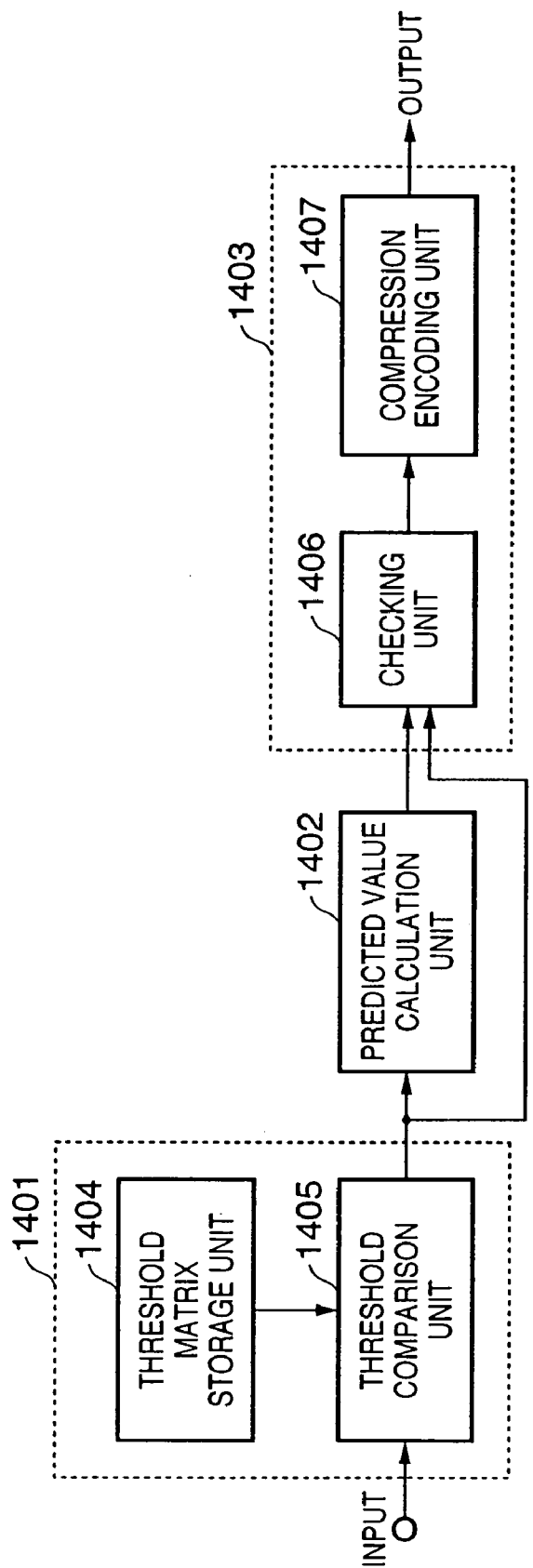
FIG. 14 is a block diagram of an image encoding apparatus in the first embodiment.

FIG. 14 is a schematic block diagram of an image compression-encoding apparatus in this embodiment. This embodiment will explain an example wherein one type of predicted value is generated from pixel values in the neighborhood of a pixel of interest.

In FIG. 14, a quantization unit 1401 includes a threshold matrix storage unit 1404 that stores a threshold matrix (threshold coefficients of a dither matrix), and a threshold comparison unit 1405 which attains binarization by comparing image data and threshold values. The output from this quantization unit 1401 is supplied to a predicted value calculation unit 1402 as predicted value calculation means, and to an encoding unit 1403.

The predicted value calculation unit 1402 calculates a predicted value on the basis of output pixel values output so far, and threshold values used in quantization. The obtained predicted value is supplied to the encoding unit 1403.

The encoding unit 1403 includes a determination unit 1406 which checks if a predicted value matches an output pixel value (binarization result), and a compression encoding unit 1407 which compresses the output from the determination unit 1406 to attain lossless compression-encoding of encoded data as a final output, and outputs the result.

The processing contents of the arrangement shown in FIG. 14 will be described in detail below. The quantization unit 1401 in this embodiment executes an ordered dither process which inputs an 8-bit (256-gray level) monochrome multi-valued image and outputs a binary pixel (1 bit). Assume that there is an implicit agreement that an encoding apparatus and decoding apparatus use a specific threshold matrix. Also, image data is input to the quantization unit 1401 in the raster order.

Assume that the threshold matrix storage unit 1404 of this embodiment stores a threshold matrix shown in FIG. 15. Also, an original image (8 bits per pixel) is a monochrome image which has a density around "100", as denoted by 1450 in FIG. 16 (in case of a color image, the arrangement of this embodiment need only be equipped for each color component). Normally, when a natural image such as a photo or the like is converted into digital image data, it does not have any special state since the density values (or luminance values) of neighboring pixels approximately have an identical value.

The threshold comparison unit 1405 compares the input image 1450 (8 bits per pixel=256 gray levels) with one threshold value read out from the threshold matrix storage unit 1404. That threshold value is obtained from the threshold matrix by selecting a line and column in accordance with the position of an input pixel in the original image.

As a result of comparison, if the input pixel value is equal to or higher than the threshold value, the threshold comparison unit 1405 outputs a 1-bit output pixel value "1"; otherwise, it outputs "0", and also outputs the threshold value used in comparison. The output pixel value and threshold value are output to the predicted value calculation unit 1402 and encoding unit 1403. Note that an actual binarization result need only be output to the encoding unit 1403.

The predicted value calculation unit 1402 receives these data, and generates and outputs a binarization predicted value at the position of the pixel of interest. The determination unit in the encoding unit 1403 checks for each pixel whether or not the binarization predicted value matches the actual binarization result from the quantization unit 1401, and outputs the result as 1-bit data per pixel to the compression encoding unit 1407. The compression encoding unit 1407 performs lossless compression encoding such as runlength encoding, and outputs the result. Note that lossless compression encoding to be adopted is not particularly limited.

A case will be exemplified below wherein the data 1450 in FIG. 16 is input as image data.

Prior to the process of the first line (first raster line), the threshold comparison unit 1405 reads out threshold values used in the process for the first line, i.e., the first line (8, 232, 24, 248) of the threshold matrix, from the threshold matrix storage unit 1404.

Next, the input pixel values of the first line are compared in turn with the threshold values to determine output pixel values. At this time, the threshold values are cyclically used. For example, the fifth pixel uses the same threshold value as the first pixel.

A pixel value "95" of the first pixel is compared with a corresponding threshold value "8". Since "95≦8", an output pixel value is binarized to "1". The second pixel is binarized to "0" since "102<232", and the third pixel is binarized to "1" since "105≧24". By repeating the similar comparison process, the binarization process of the first line is completed.

Upon completion of binarization of the last pixel of the first line, the threshold comparison unit 1405 reads out threshold values used in the process for the second line, i.e., the second line (168, 72, 184, 88) of the threshold matrix, from the threshold matrix storage unit 1404 so as to repeat the same process. After that, the binarization processes for the third and fourth lines are executed.

The threshold matrix also cyclically uses lines. That is, in the fifth line, binarization is made using the same threshold values (8, 232, 24, 248) as those in the first line.

That is, let i (i≧0) be the position in the raster (main scan) direction, j (j≧0) be the position in the sub-scan direction, D(i, j) be a pixel value to be quantized, and T(0, 0) to T(3, 3) be threshold values stored in the threshold matrix storage unit 1404. Then, a threshold value to be compared with the pixel value D(i, j) can be defined by T(i mod 4, j mod 4). Note that "a mod b" is a function that returns a remainder obtained upon dividing a by b. In hardware implementation, 2-bit line and column addresses (a total of 4 bits) can be input to a memory that stores threshold values.

Figure 17:
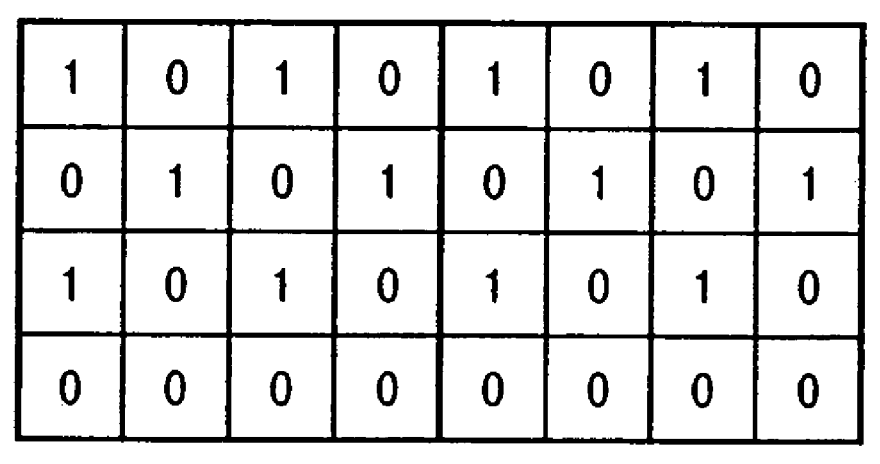

In this way, the output binary image data of the threshold comparison unit 1405 can be obtained, as shown in FIG. 17. Hence, if a pair of a pixel value (1 bit) as a binarization result and threshold value is expressed by n(binary data, threshold value)n, data to be supplied to the predicted value calculation unit 1402 are as shown in FIG. 18.

If a pixel position of interest is expressed by (i, j), the predicted value calculation unit 1402 as predicted value calculation means of this embodiment determines a binarization predicted value Y at the pixel position of interest on the basis of pixels B(i−1, j) and B(i−2, j) of the two left-neighboring binarization results of that pixel position, a threshold value T(i mod 4, j mod 4) as a density class value at the pixel position of interest, and a threshold value T((i−1) mod 4, j mod 4) as a density class value of the left neighboring pixel under the conditions shown in FIG. 19. When the pixel position of interest is at the head of a line, since there are no two left-neighboring pixels, binarization results in a region falling outside the image range are considered "0".

As the first condition in FIG. 19, when the binarization results of the two left-neighboring pixels of the pixel position of interest have the same value, the binarization result at the pixel position of interest is more likely to assume the same value. Hence, the left neighboring binarization result is determined as a binarization predicted value Y at the pixel position of interest.

As the second condition, when the binarization result at the second left-neighboring pixel position of the pixel of interest is different from the first left-neighboring binarization result, a binarization predicted value Y at the pixel position of interest is determined on the basis of the threshold value T used upon binarizing the pixel value at the pixel position of interest and the first left-neighboring binarization threshold value.

In either case, the predicted value Y is calculated based on the neighboring binarization results and threshold values of the pixel of interest in a line that includes the pixel of interest.

The reason for the second condition will be explained below.

The binarization threshold value T(i mod 4, j mod 4) at the pixel position of interest becoming larger than the (first left-neighboring) binarization threshold value T((i−1) mod 4, j mod 4) immediately before the pixel position of interest means to act in a direction in which it is hard to binarize the pixel of interest to "1", i.e., in a direction in which it is easy to binarize it to non. Therefore, if T((i−1) mod 4, j mod 4)<T(i mod 4, j mod 4) holds, the binarization predicted value Y at the pixel position of interest is set "0".

On the other hand, if the binarization threshold value T at the pixel position of interest is equal to or smaller than the (first left-neighboring) binarization threshold value T immediately before the pixel position of interest, a pixel value at the pixel position of interest after quantization is prone to be "1". Therefore, if T((i−1) mod 4, j mod 4)≧T(i mod 4, j mod 4) holds, the binarization predicted value Y at the pixel position of interest is set "1".

A case will be explained below wherein data as sets of (binarization result, threshold value) shown in FIG. 18 are input to the predicted value calculation unit 1402 of this embodiment.

The head (first) pixel of the first line is selected as a pixel of interest, and its binarization predicted value Y(0, 0) is calculated. There are no first and second left-neighboring pixels of the pixel position of interest. As described above, since the binarization results of two nonexistent pixels are assumed "0", they satisfy a case of B(i−1, j)=B(i−2, j)=0 in FIG. 19, and the binarization predicted value Y(0, 0)="0" of the pixel of interest (head pixel of the line) is determined.

When the second pixel position is selected as a pixel of interest, its binarization predicted value Y(1, 0) is calculated as follows.

Since the first left-neighboring binarization result B(0, 0)="1" and the binarization result B(−1, 0) of the second left-neighboring pixel (binarization result of a nonexistent pixel)="0", they are not equal to each other. Therefore, the binarization predicted value Y(1, 0) at the pixel position of interest is determined based on a binarization threshold value T(1, 0) at the pixel position of interest and a binarization threshold value T(0, 0) of the first left-neighboring pixel. Since the binarization threshold value T(1, 0) at the pixel position of interest=232 and the first left-neighboring binarization threshold value T(0, 0)=8, they satisfy T((i−1) mod 4, j mod 4)<T(i mod 4, j mod 4) in FIG. 19. Therefore, the binarization predicted value Y(1, 0)="0" of the pixel of interest is determined.

When the third pixel position is selected as a pixel of interest, its binarization predicted value Y(2, 0) is calculated as follows. That is, since the second left-neighboring binarization result B(0, 0)="1" and the first left-neighboring binarization result B(1, 0)="0", they are not equal to each other. Hence, the binarization predicted value Y(2, 0) at the pixel position of interest is calculated based on threshold values. At this time, since T(2, 0)="24" and T(1, 0)="232", they satisfy T((i−1) mod 4, j mod 4)≧T(i mod 4, j mod 4) in FIG. 19. Hence, Y(2, 0)="1".

By similarly repeating the above process, binarization predicted values Y={0, 0, 1, . . . } can be obtained by the processes for one line. Upon completion of the processes for the first line, the same processes are repeated in turn from the head pixel of the second line up to the last pixel position of the last line.

FIG. 20 shows the binarization predicted values at respective pixel positions obtained by the aforementioned processes.

The determination unit 1406 in the encoding unit 1403 of this embodiment receives binarization predicted value data (see FIG. 20) from the predicted value calculation unit 1402, and the binarization result (see FIG. 17) of the quantization unit 1401. When the binarization predicted value matches the actual binarization result, i.e., when the binarization result as predicted can be obtained, the unit 1406 outputs a determination result "0" to the compression encoding unit 1407 for each pixel; when the binarization result does not match the predicted value, it outputs "1". As the simplest implementation of the determination circuit 1406, a 2-input, 1-output EXOR circuit may be used.

FIG. 21 shows the output from the determination unit 1406 upon reception of the predicted value data shown in FIG. 20 and the binarization result data in FIG. 17.

As shown in FIG. 21, the reason why the determination result of the first or second pixel of each line is "1" (the binarization result does not match the binarization predicted value) is that the binarization results beyond the image region are accounted for "0". However, many "0"s are generated, and binary data "1" and "0" successfully have less frequencies of occurrence.

The compression encoding unit 1407 is not particularly limited as long as it adopts a lossless compression technique such as runlength encoding and the like, and a detailed description thereof will be omitted. As can be seen from the above description, a greatly higher compression efficiency than a case wherein the binarization result shown in FIG. 17 is encoded can be obtained. Note that the output destination of encoded data is not particularly limited. For example, when encoded data is saved in a storage device, a file that includes the encoded data together with information indicating the image size, the number of pixels per line, and the like is saved.

As can be seen from the above description, the compression encoding efficiency is improved with increasing ratio of binarization predicted values that match actually binarized results. In addition, the algorithm for calculating the predicted value can calculate it using only data at positions near the pixel of interest in a line including the pixel of interest. When such algorithm is implemented by hardware, only a very small circuit scale is required.

Note that the arrangement of threshold values in a dither matrix becomes an important factor upon calculating the predicted values. The reason for this will be explained below.

Assume that four threshold values in a given line of a dither matrix having a 4×4 size is {232, 8, 24, 248}, and a multi-valued pixel D of interest is to be binarized using the third threshold value "24" of these threshold values. If the second left-neighboring binarization result of the multi-valued pixel of interest is not equal to the first left-neighboring binarization result, the binarization predicted value Y of the pixel of interest=0 according to this embodiment. This is because the threshold value "24" of the pixel of interest is larger than the immediately preceding threshold value "8".

Since the binarization threshold value at the pixel position of interest becomes larger than that of the immediately preceding pixel, this fact acts in a direction in which it is easy to binarize the pixel of interest to non However, since the difference between numerical values "8" and "24" is smaller than a 8-bit dynamic range of input image data, the reliability is not so high. That is, in the above embodiment, a correct predicted value is expected as the difference (absolute value) between the threshold value at the pixel position of interest and that at the immediately preceding pixel position is larger. Therefore, in a line that form the dither matrix (in a direction of the binarization process), neighboring threshold values desirably have a large difference.

Therefore, let T1, T2, . . . , TN be threshold values of a dither matrix, which are arranged in descending order. Then, it is convenient to adopt a dither matrix in which these threshold values are discretely arranged in the order of threshold values T1, T2, . . . . There are some types of well-known dither matrices. Of these dither matrices, a dither matrix of Bayer type or similar layout is suited to obtain predicted values.

Figure 22:
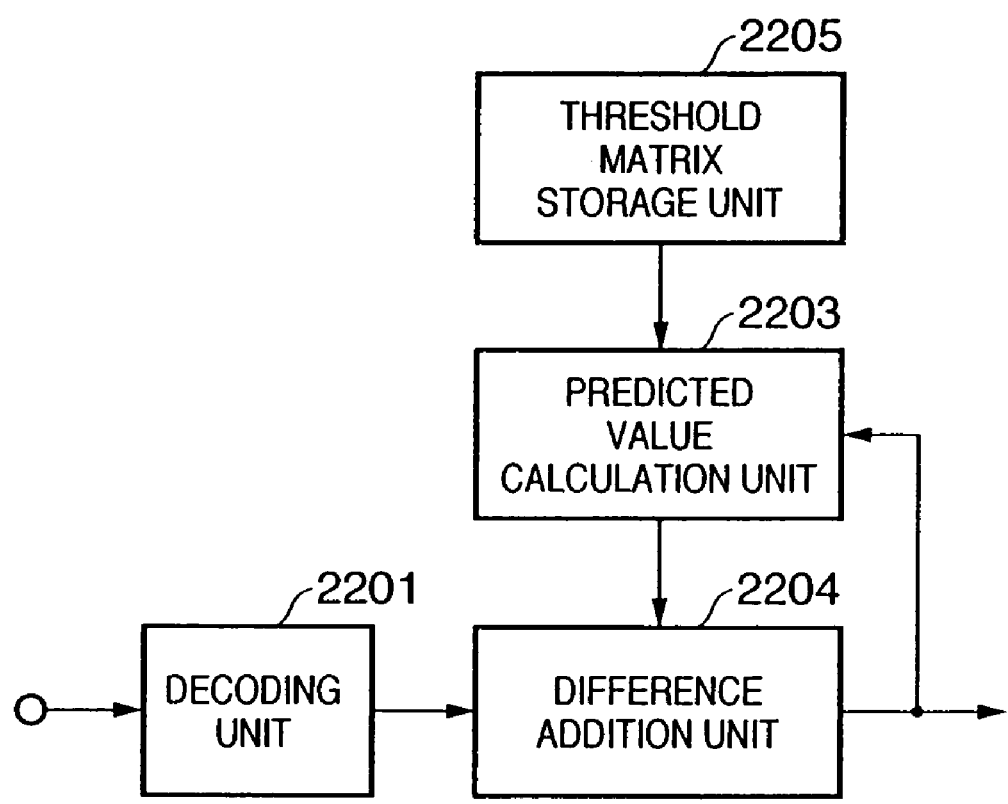
FIG. 22 is a block diagram of an image decoding apparatus in the first embodiment.

The operation of an apparatus for receiving and decoding the compression-encoded data generated by the above embodiment will be described below. FIG. 22 is a block diagram of that apparatus.

As described above, the compression encoding unit 1407 in FIG. 14 performs a lossless compression encoding process. Hence, a decoding unit 2201 in FIG. 22 performs a process opposite to the process executed by the unit 1407 to convert encoded data into difference code data shown in FIG. 21, and a description thereof will be omitted.

A threshold matrix storage unit 2205 is set with the same contents (see FIG. 15) as the threshold matrix storage unit 1404 in the encoding apparatus. A predicted value calculation unit 2203 calculates predicted values on the basis of some of output image data obtained so far, and threshold values corresponding to the pixel position of interest and immediately preceding pixel position. A difference addition unit 2204 reconstructs output image data on the basis of the difference code data from the decoding unit 2201 and the predicted values from the predicted value calculation unit 2203, thus generating binary image data.

The following description will be given under the assumption that difference code data shown in FIG. 21 are obtained by the decoding unit 2201 from encoded data.

The threshold matrix storage unit 2205 stores the same element data (threshold value data) of the threshold matrix shown in FIG. 15 as those used in the process of the image processing apparatus of the first embodiment. The predicted value calculation unit 2203 calculates predicted values by the same process as the predicted value calculation unit of the first embodiment, i.e., according to the conditions shown in FIG. 19. Note that the decoded binarization results of two left neighboring pixels beyond the head pixel of each raster are accounted for "0". Also, data shown in FIG. 21 are expressed by E(i, j) as their coordinate positions.

Binary data B(0, 0) at the head of the first line is calculated as follows.

Since there are no pixels to be referred to, i.e., since both the decoded binary data as the second and first left-neighboring decoding results are "0", the predicted value calculation unit 2203 determines a predicted value Y(0, 0) of the pixel of interest="0". On the other hand, since difference data E(0, 0) at the pixel position of interest="1", this means that wrong prediction is made. Since the predicted value Y(0, 0)="0" is incorrect, the decoded binarization result B(0, 0)="1" of the pixel of interest is determined.

Binary data B(1, 0) of the second pixel of interest of the first line is calculated as follows.

Since the second left-neighboring decoded binarization result B(−1, 0) of the pixel of interest (nonexistent pixel position)="0", and an actual first left-neighboring decoded binarization result B(0, 0)="1", they are different from each other. Also, a difference value E(1, 0) at the pixel position of interest="0", this means that the binarization predicted value at the pixel position of interest upon encoding is correct. According to FIG. 15, since the threshold value T(1, 0) at the pixel position of interest="232" and the immediately preceding threshold value T(0, 0)="8", T(0, 0)<T(1, 0). That is, this means that the binarization predicted value "0" which is obtained by determining T((i−1) mod 4, j mod 4)<T(i mod 4, j mod 4) in FIG. 19 is correct. Therefore, binary pixel data B(1, 0) of the pixel of interest="0" is determined.

The third pixel in the first line is selected as a pixel of interest, and its binary data B(2, 0) is calculated as follows.

Since the second left-neighboring decoded binarization result B(0, 0) of the pixel of interest="1", and the first left-neighboring decoded binarization result B(1, 0)="0", they are different from each other. Also, a difference value E(2, 0) at the pixel position of interest="0", this means that the binarization predicted value at the pixel position of interest upon encoding is correct. According to FIG. 15, since the threshold value T(2, 0) at the pixel position of interest="24" and the immediately preceding threshold value T(1, 0)="232", T(1, 0)≧T(2, 0). That is, this means that the binarization predicted value "1" which is obtained by determining T((i−1) mod 4, j mod 4)≧T(i mod 4, j mod 4) in FIG. 19 is correct. Therefore, binary pixel data B(1, 0) of the pixel of interest="1" is determined.

The above process is repeated up to the last pixel of the first line. Upon completion of these processes, the same process is repeated in turn from the head pixel of the second line. When the process is repeated until the last pixel of the last line, binary image data before compression encoding shown in FIG. 17 can be completely decoded.

In this embodiment, the same dither matrix must be prepared in both the encoding and decoding apparatuses. Strictly speaking, the decoding side does not require individual coefficients of the dither matrix, but need only have information indicating the magnitude relationship between right and left neighboring threshold values. Since it is assumed that no identical threshold values are present, the magnitude relationship can be expressed by 1 bit. Therefore, in order to hold 4×4 magnitude relationships, 16-bit information suffices. Hence, even when this information is stored in a header or the like upon transmitting encoded data, the data size of matrix information required for decoding is small with respect to the total data size.

In this embodiment, the dither matrix size is 4×4. However, the present invention is not limited to this, and the dither matrix size can be generally expressed by N×M. As one condition, the predicted value of the binarization result of the pixel of interest is determined with reference to the states of the first and second left-neighboring binarization results of the pixel of interest. However, whether or not n binarization results for n pixel positions before the pixel of interest are equal to each other may be checked as a condition.

In this embodiment, when the first and second left-neighboring binarization results are not equal to each other, the binarization predicted value of the pixel of interest is calculated based on the magnitude relationship between the threshold value of the pixel of interest and that at the immediately preceding pixel position. However, the present invention is not limited to this.

For example, assume that a threshold value at the pixel position of interest is expressed by Ti since threshold values in a given line need only be considered. The binarization result of the second left-neighboring pixel being not equal to that of the first left-neighboring pixel means that the input pixel value at the pixel position of interest is more likely to be at the middle of Ti−1 and Ti−2. Let Tm (=(Ti−1+Ti−2)/2) be that median. Then, if Tm<T1, the binarization predicted value Y at the pixel position of interest may be determined to be "0"; if Tm≧Ti, Y="1" may be determined.

Figure 23:
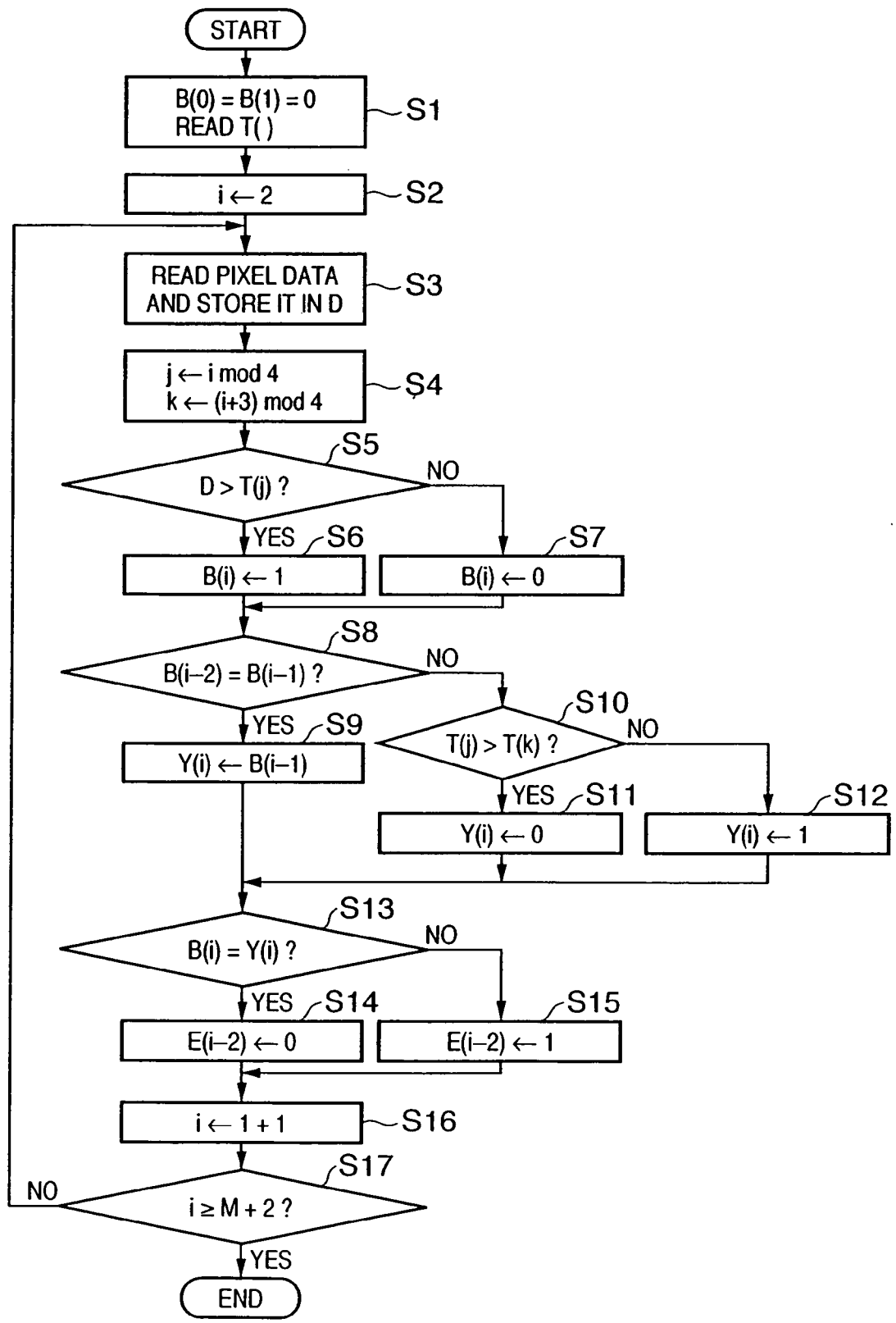
FIG. 23 is a flowchart showing the difference data generation processing sequence when the encoding process of the first embodiment is implemented by a computer program.

Furthermore, the function implementation means of this embodiment can be implemented by a computer program. When that computer program runs on a general-purpose information processing apparatus such as a personal computer or the like, it can be executed in, e.g., the sequence shown in FIG. 23. Note that the block diagram of the general-purpose information processing apparatus is known to those who are skilled in the art, and is omitted. Also, FIG. 23 shows only the process for generating difference data (data in FIG. 21) for one line.

Furthermore, one line of an image to be binarized includes M pixels, B( ) is a variable that stores a binarization result, D( ) is a variable that inputs a multi-valued pixel to be binarized, T( ) is a variable that stores threshold values (four threshold values in this embodiment) for one line of the dither matrix, T( ) is a variable that stores a predicted value, and E( ) is a variable that stores difference data. Note that variable B(0) stores the binarization result at the second left-neighboring pixel position of the head pixel of one line, B(1) stores the binarization result at the first left-neighboring pixel position, and binarization results of pixels for one line are stored in B(2) and subsequent variables. This is to obtain a normal result even when a negative value cannot be used as an index of a variable.

In step S1, variables B(0) and B(1) are reset to zero, and corresponding threshold values of the dither matrix are stored in variable T( ).

In step S2, "2" is set as an initial value in variable i indicating the pixel position. In step S3, pixel data to be binarized is read and stored in variable D. In step S4, in order to obtain threshold value T corresponding to pixel position i of interest, the remainder obtained by dividing variable i by 4 is set in variable j. In order to obtain threshold value T immediately before the pixel position of interest, the remainder obtained by dividing the sum of 3 and variable i by 4 is set in variable k.

After the flow advances to step S5, it is checked if the pixel value of interest is larger than threshold value T(j). If the pixel value of interest is larger than threshold value T(j), "1" is set in binarization result B(i) of the pixel of interest (step S6). If it is determined that the pixel value of interest is equal to or smaller than threshold value T(j), "0" is set in binarization result B(i) of the pixel of interest (step S7).

In either case, the flow advances to step S8 to check if second and first left-neighboring binarization results B(i−2) and B(i−1) are equal to each other.

If B(i−2)=B(i−1), binarization result B(i−1) at the immediately preceding pixel position is stored in binarization predicted value Y(i) at the pixel position of interest in step S9.

If it is determined in step S8 that B(i−2)≠B(i−1), the flow advances to step S10 to compare threshold value T(j) at the pixel position of interest with threshold value T(k) at the immediately preceding pixel position. If it is determined that T(j)>T(k), "0" is set in binarization predicted value Y(i) at the pixel position of interest (step S11); if it is determined that T(j)≦T(k), "1" is set in Y(i) (step S12).

In this way, after binarization predicted value Y(i) of the pixel of interest is determined, the flow advances to step S13. In step S13, actual binarization result B(i) of the pixel of interest is compared with binarization predicted value Y(i). If the two values match, i.e., if binarization is made as predicted, n on is stored in difference variable E(i−2) (step S14); if they do not match (a wrong predicted value is obtained), "1" is stored in variable E(i−2) (step S15). The reason why "2" is subtracted from variable i upon storing in variable E is to store a difference value from E(0).

After that, variable i is incremented by "1" in step S16, and it is checked in step S17 if the difference calculation process up to the last pixel position of one line is complete. If the process is complete, this process ends, and difference data E( ) for one line undergo a compression encoding process to process the next line. On the other hand, if it is determined in step S16 that the process for the last pixel of one line is not complete yet, the processes in step S3 and subsequent steps are repeated.

Note that three binarization results, i.e., those of the pixel of interest and the first and second left-neighboring pixels need only be referred to. Hence, variable B( ) has a capacity for storing three data, and can be shifted in turn.

When the decoding process is executed by a host computer, it will be sufficiently understood from the above description, and a description thereof will be omitted.

As a program that executes the above process in the host computer, a printer driver may be used. That is, the above process is executed when an image which is sensed by a digital camera or the like and is passed from an application is to be output to a printer. Of course, the printer side need only execute the aforementioned decoding process.

In this embodiment, binarization has been exemplified. However, the present invention may be applied to 3-valued conversion, 4-valued conversion, and the like. Data after 4-valued conversion assumes one of values 0, 1, 2, and 3. In this case, three dither matrices (threshold matrices) can be defined. Let A, B, and C be three dither matrices, and $A_{i,j}$, $B_{i,j}$, and $C_{i,j}$ be threshold values in respective matrices. Then, the three matrices have a relation given by:

$$A_{i,j} < B_{i,j} < C_{i,j}$$

Then, binary data are generated respectively using dither matrices A, B, and C. As a result, since individual binary data planes can be considered as the binarization results of this embodiment, the present invention can be applied to 4-valued conversion and the like.

Figure 24A:
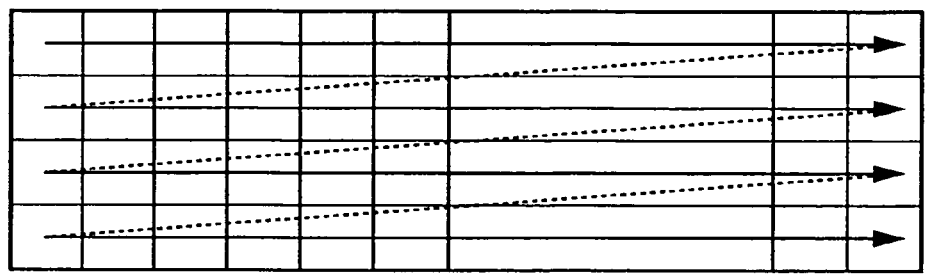
FIGS. 24A to 24C show examples of scan directions.
Figure 24B:
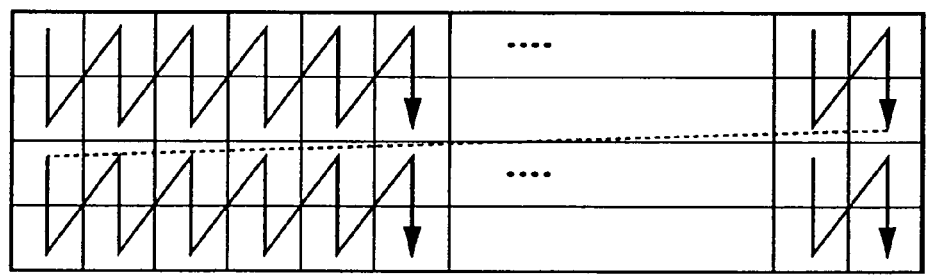
Figure 24C:
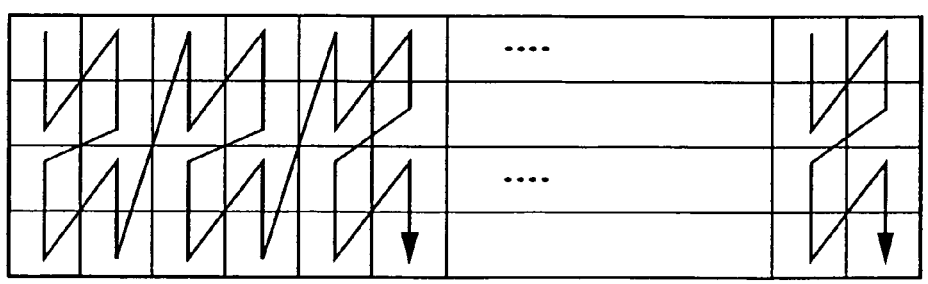

In this embodiment, the process is done for each line, and pixels on one line are referred to, as shown in FIG. 24A. However, the present invention can also be applied to a case wherein the process is done for a plurality of lines, and a pixel immediately before the pixel of interest is not present on an identical line, as shown in FIGS. 24B and 24C. In this case, reference pixels may be determined based on the order of processes and the positional relationship with respect to the pixel of interest.

Second Embodiment

The second embodiment will be described below. The second embodiment will explain an example in which the present invention is applied to an image processing apparatus that calculates threshold values by a periodic function with which the period of the calculated threshold values is not always an integer. In this embodiment, density class values that classify threshold values based on the frequencies of occurrence of output values are used in prediction in place of threshold values themselves.

Figure 25:
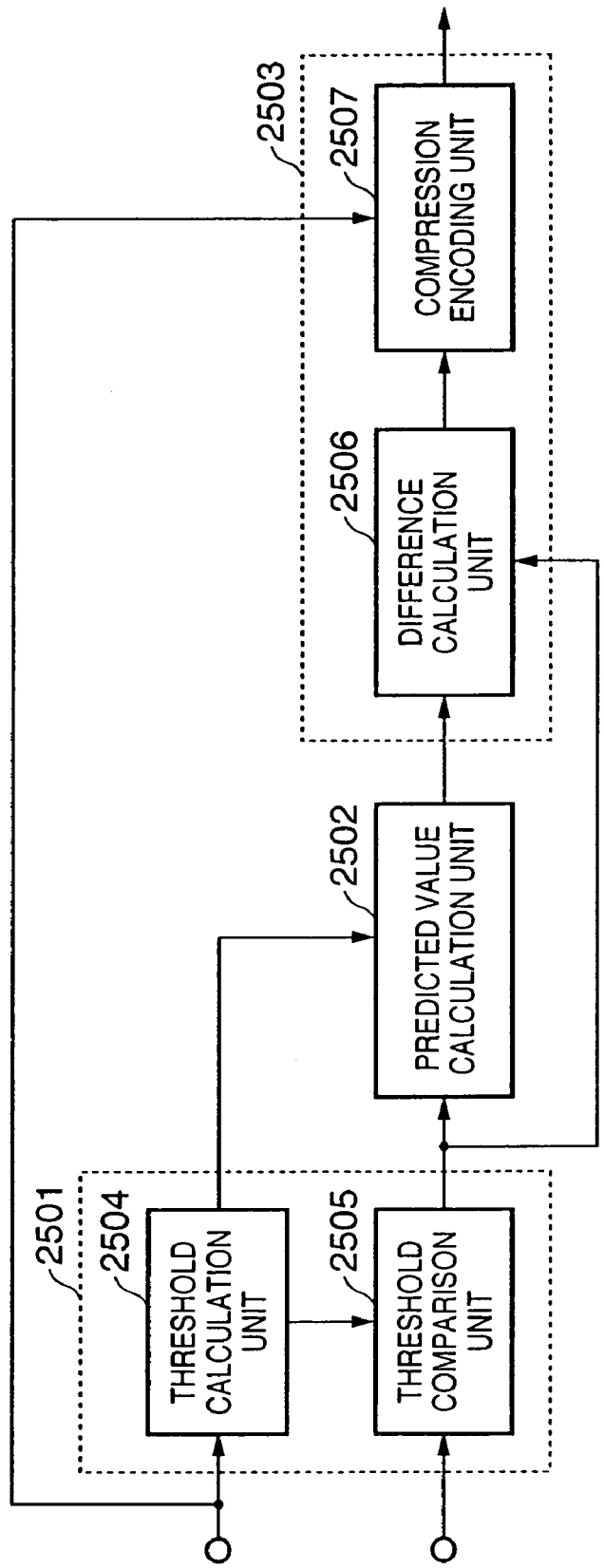
FIG. 25 is a block diagram of an image encoding apparatus in the second embodiment.

FIG. 25 is a schematic block diagram of this embodiment.

A grayscale conversion unit 2501 includes a threshold calculation unit 2504 and threshold comparison unit 2505. The threshold calculation unit 2504 calculates a threshold value on the basis of input attribute information (obtained by an image region determination process (not shown)) for each pixel. The threshold comparison unit 2505 calculates an output pixel value on the basis of an input pixel value and the input threshold value. The threshold calculation unit 2504 determines parameters θ, ω, and d in accordance with attribute information (e.g., background, text/line art, halftone image) for each pixel, and calculates threshold value t using:

$$x' = x \cos\theta - y \sin\theta \quad (1\text{-}1)$$

$$y' = x \sin\theta + y \cos\theta \quad (1\text{-}2)$$

$$a = \sin(2p\omega x') + \sin(2p\omega y') \quad (2)$$

$$t = (a+2) \times (n-2d-3)/4 + d + 3/2 \quad (3)$$

on the basis of the number n of gray levels and pixel position (x, y) of input image data. Note that threshold value t is finally calculated as an integer by rounding off a decimal part. Then, threshold value t becomes an integer falling the range from d+1 to n−d−2 (both inclusive).

The threshold calculation unit 2504 determines a density class to be used in a predicted value calculation unit 2502 later in accordance with the type of attribute and the threshold value. In this embodiment, two types of attributes (text, image) are taken into consideration, and one of these attributes is always exclusively assigned to each pixel. In case of a color image, there are, for example, Y, M, C, and K. Parameters θ, ω, and d are independently set for each color component. The following description will be given for a monochrome image or one color component.

A case will be explained below wherein parameter d=4 is set for a text attribute, and d=16 is set for a halftone image attribute in an 8-bit input image (n=256). With this setup, the frequency of occurrence of a halftone image (output pixel value 1) is low in a text region and is high in an image region, thus obtaining a preferred output.

The density classes are classified in accordance with the attributes and threshold values, as shown in FIG. 26, and a median of the threshold value range to be classified to each class is defined as a class representative value.

The threshold comparison unit 2505 compares input pixel value p with threshold value t to obtain output pixel value r. In this case, if p<t−d, r=0; if p>t+d, r=2; otherwise, r=1.

The prediction method in the predicted value calculation unit 2502 will be described below.

Figure 27:
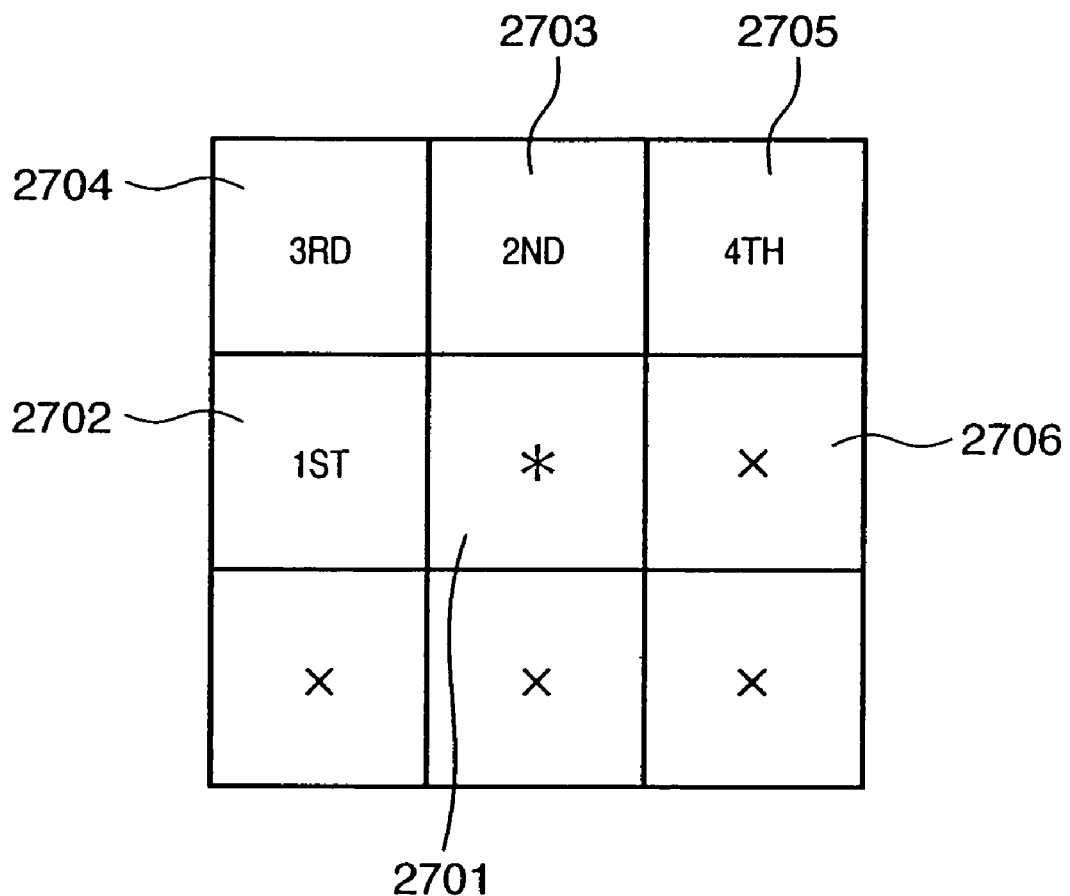
FIG. 27 shows priority in reference pixel selection in the second embodiment.

A method of selecting reference pixels will be described below with reference to FIG. 27. In the neighborhood of a pixel 2701 to be predicted, reference pixels having the same attribute information are selected in the priority order of pixels 2702, 2703, 2704, and 2705, as shown in FIG. 27. At this time, a pixel 2706 cannot be processed since it is not processed yet.

Whether or not pixels have the same attribute information can be determined based on the density class. More specifically, if the density class of the pixel 2701 to be predicted is 0 or 1, reference pixels having the density class 0 or 1 can be selected; if the density class of the pixel 2701 to be predicted is one of 2 to 4, reference pixels having one of the density classes 2 to 4 can be selected.

When all the pixels 2702 to 2705 have attribute information different from that of the pixel 2701 to be predicted, reference pixels are handled as follows. If the density class of the pixel 2701 to be predicted is 0 or 1, density class 0 of each reference pixel and output pixel value 2 are assumed. Alternatively, density class 2 of each reference pixel and output pixel value 0 are assumed.

When some or all of reference pixels fall outside an image at the image end portion, these reference pixels are assumed to have attribute information different from that of the pixel to be predicted.

In this manner, the reference pixels and pixel to be predicted are set to have the same attribute information. The method of calculating a predicted value will be explained below.

A case will be explained first wherein the attribute information of the pixel to be predicted is text/line art attribute.

Figure 28:
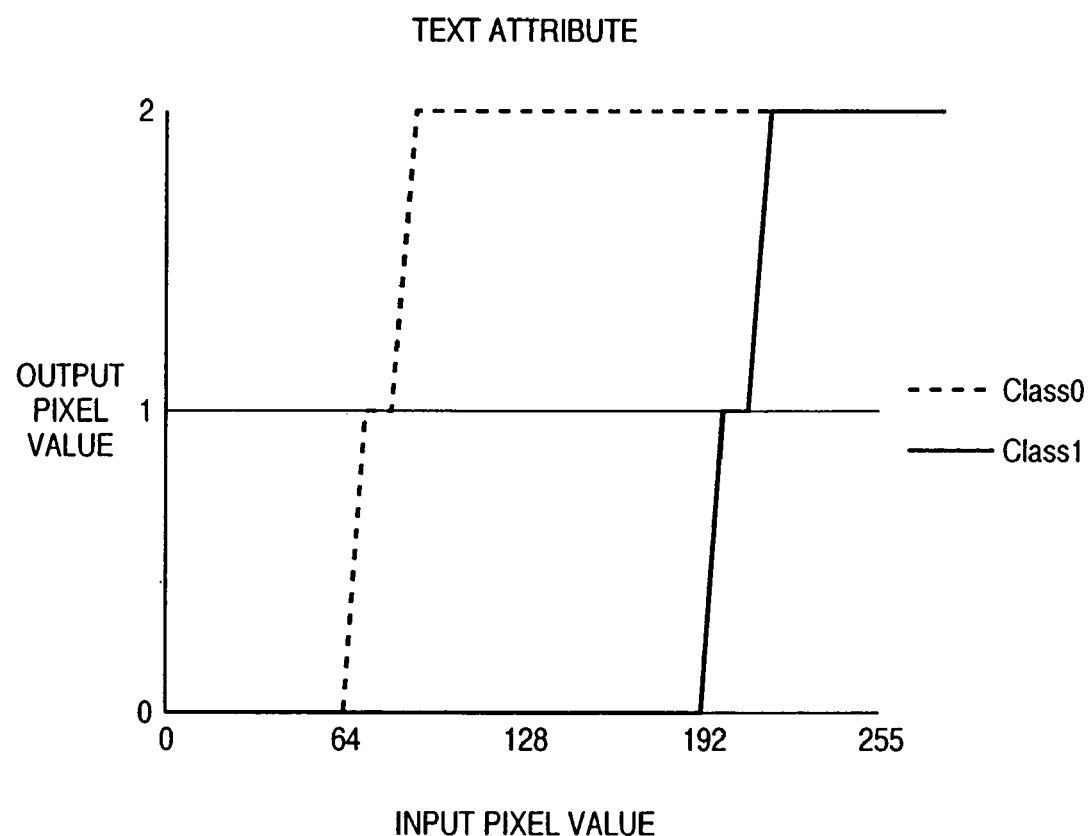
FIG. 28 shows the relationship between the input and output pixel values of a text attribute in the second embodiment.

When the output pixel value is calculated by comparing the input pixel value and the class representative value in the density class (0 or 1) corresponding to the text attribute, the relationship shown in FIG. 28 is obtained.

Output pixel values corresponding to input pixel values (8 bits) 30, 60, 190, and 210 are as shown in FIG. 29. Using this relationship, prediction is made, as shown in FIG. 30.

That is, when pixels belong to the same density class, the output pixel value of the reference pixel is determined as the predicted value. When the predicted value of density class 1 is to be determined from the reference pixel of density class 0, if the output pixel value of the reference pixel is 0 or 1, predicted value 0 is determined; otherwise, predicted value 2 is determined. When the predicted value of density class 0 is to be determined from the reference pixel of density class 1, if the output pixel value of the reference pixel is 0, predicted value 0 is determined; otherwise, predicted value 2 is determined.

With this prediction, when the reference pixel and the pixel to be predicted have the same input pixel value, prediction practically hits.

A case will be explained below wherein the attribute information of the pixel to be predicted is an image (halftone image) attribute.

Figure 31:
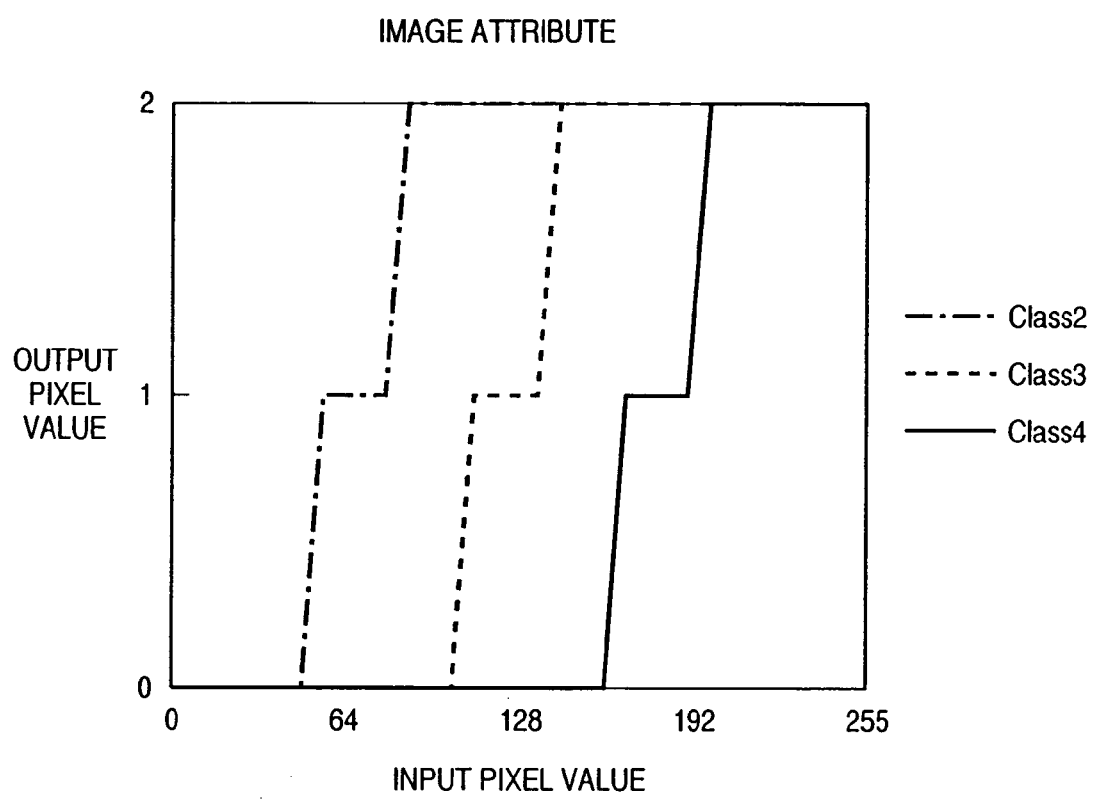
FIG. 31 shows the relationship between the input and output pixel values of an image attribute in the second embodiment.

When the output pixel value is calculated by comparing the input pixel value and the class representative value in the density class (2, 3, or 4) corresponding to the image attribute, the relationship shown in FIG. 31 is obtained.

Prediction is made using this relationship, as shown in FIG. 32. By calculating the predicted value, as described above, the output pixel value can be predicted in consideration of the threshold value of the dither process.

An encoding unit 2503 includes a difference calculation unit 2506 for calculating the difference between the predicted value and output pixel value, and a compression encoding unit 2507 for encoding attribute information required for a decoding process, and difference information.

In this embodiment, since the output pixel value ranges from 0 to 2, the difference in case of predicted value 0 is one of 0, +1, and +2, that in case of predicted value 1 is one of −1, 0, and +1, and that in case of predicted value 2 is one of −2, −1, and 0.

Hence, the difference calculation unit 2506 generates one of three different intermediate code A, B, and C in correspondence with the difference from the predicted value, and supplies it to the compression encoding unit 2507.

The compression encoding unit 2507 encodes attribute information and intermediate codes for each line. The unit 2507 encodes attribute information for one line in accordance with Modified Huffman (MH) coding, which is a standard in facsimile transmission, and then encodes intermediate codes that express difference values. Note that details of MH coding are described in the CCITT recommendation T.4, and a description thereof will be omitted.

Codes of difference values use a code table shown in FIG. 34. Codes respectively corresponding to intermediate codes A, B, and C are defined, and formats that express runs of eight or more "A"s are defined. Such definitions of the code table not only can improve the compression ratio but also can prevent occurrence of the same sequence as an EOL code "000000000001" which has a special meaning in MH coding as a result of a run of intermediate codes A.

No special codes are defined for runs of nine "A"s, 16 "A"s, and the like. However, encoding may be done by separating nine "A"s into eight "A"s+A, 16 "A"s into eight "A"s+eight "A"s, and so forth, as in an example of FIG. 35.

Third Embodiment

The third embodiment will be described below. This embodiment and subsequent embodiments adaptively select two different prediction methods, i.e., a prediction method using the period of threshold values, and a prediction method based on neighboring pixel values of the pixel of interest, so as to implement satisfactory compression of vertical stripe image data equal to a change period of threshold values, which is difficult for the conventional method described in Japanese Patent Laid-Open No. 8-223428 to deal with.

In this embodiment, encoding is made for respective lines. For the sake of simplicity, a case will be exemplified below wherein image data which is defined by 8 bits (256 gray levels) per pixel undergoes a dither process to 2 bits (four gray levels=4-valued data) per pixel, and the dithered image is to be encoded.

This dither process is executed using three dither matrices each having an n×m pixel size, e.g., 8×8 dither matrices shown in FIGS. 3A to 3C.

Assume that a pixel value (8 bits) of an input original image is expressed by D(i, j) where i is the horizontal pixel position and j is the vertical pixel position (the number of lines). Then, a threshold value T1 of a dither matrix 301, a threshold value T2 of a dither matrix 302, and a threshold value T3 of a dither matrix 303, which are used to convert that pixel into 4-valued data, can be respectively expressed by T1($i$ mod 8, j mod 8), T2($i$ mod 8, j mod 8), and T3($i$ mod 8, j mod 8) (where "x mod y" is a function that returns the remainder upon dividing x by y). That is, the threshold values T1 to T3 change at an 8-pixel period as the horizontal size of the dither matrices in the horizontal direction, and also at an 8-pixel period in the vertical direction.

In order to convert a pixel D(i, j) of interest into 4-valued data, the pixel D(i, j) of interest is respectively compared with the threshold values T1($i$ mod 8, j mod 8), T2($i$ mod 8, j mod 8), and T3($i$ mod 8, j mod 8), to calculate the number of threshold values which become smaller than the pixel D(i, j) of interest. Since the number of threshold values is three, the calculation result can be expressed by a value ranging from 0 to 3, i.e., 2 bits. Hence, the 8-bit pixel value can be quantized to 2 bits, i.e., 4-valued data.

In this embodiment, the average value of the threshold values T1($i$ mod 8, j mod 8), T2($i$ mod 8, j mod 8), and T3($i$ mod 8, j mod 8) of the dither matrices 301, 302, and 303 is defined as a dither average threshold value. In this embodiment, the dither average threshold value is equal to the dither matrix 302.

Figure 38:
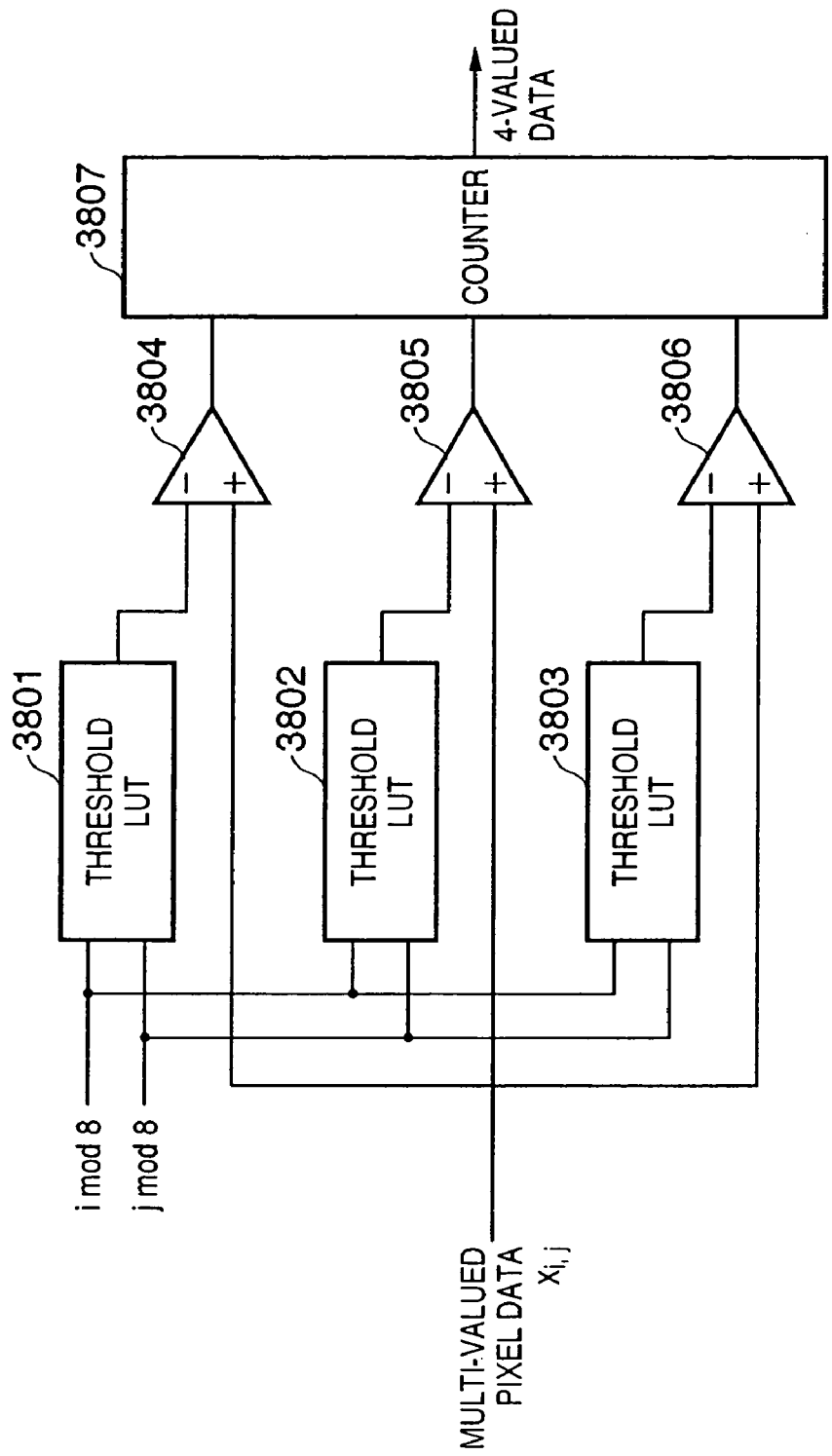
FIG. 38 is a circuit diagram showing the arrangement of a dither conversion circuit that attains 4-valued conversion in the third embodiment.

FIG. 38 shows an example of a dither circuit arrangement that converts 256 gray levels (8 bits) into 4 gray levels (2 bits).

Referring to FIG. 38, reference numerals 3801 to 3803 respectively denote threshold lookup tables (LUTs) which store the threshold values of the dither matrices shown in FIGS. 3A to 3C. Reference numerals 3804 to 3806 denote converters, each of which outputs a 1-bit signal "1" when the value input to the [+] terminal is equal to or larger than that input to the [−] terminal; or which outputs a signal "0" otherwise. Reference numeral 3807 denotes a counter which counts "1"s output from the comparators 3804 to 3806, and outputs the count result as a 2-bit signal.

In FIG. 38, when the multi-valued pixel data D(i, j) of interest is input, values of i mod 8 and j mod 8 (equivalent to the lower 3 bits of a pixel address) are supplied as address signals of the LUTs 3801 to 3803. As a result, the threshold LUTs 3801 to 3803 output corresponding threshold values T1, T2, and T3. The comparators 3804 to 3806 respectively compare the input multi-valued pixel data D with these threshold values, and supply their comparison results to the counter 3807. Since the number of "1"s output from the comparators 3804 to 3806 is 3 in maximum or 0 in minimum, a 2-bit signal according to the number of "1"s, i.e., image data after the dither process, is output.

An example of compression-encoding image data after the aforementioned dither process will be described below with reference to the arrangement of an image processing apparatus shown in FIG. 1.

Figure 1:
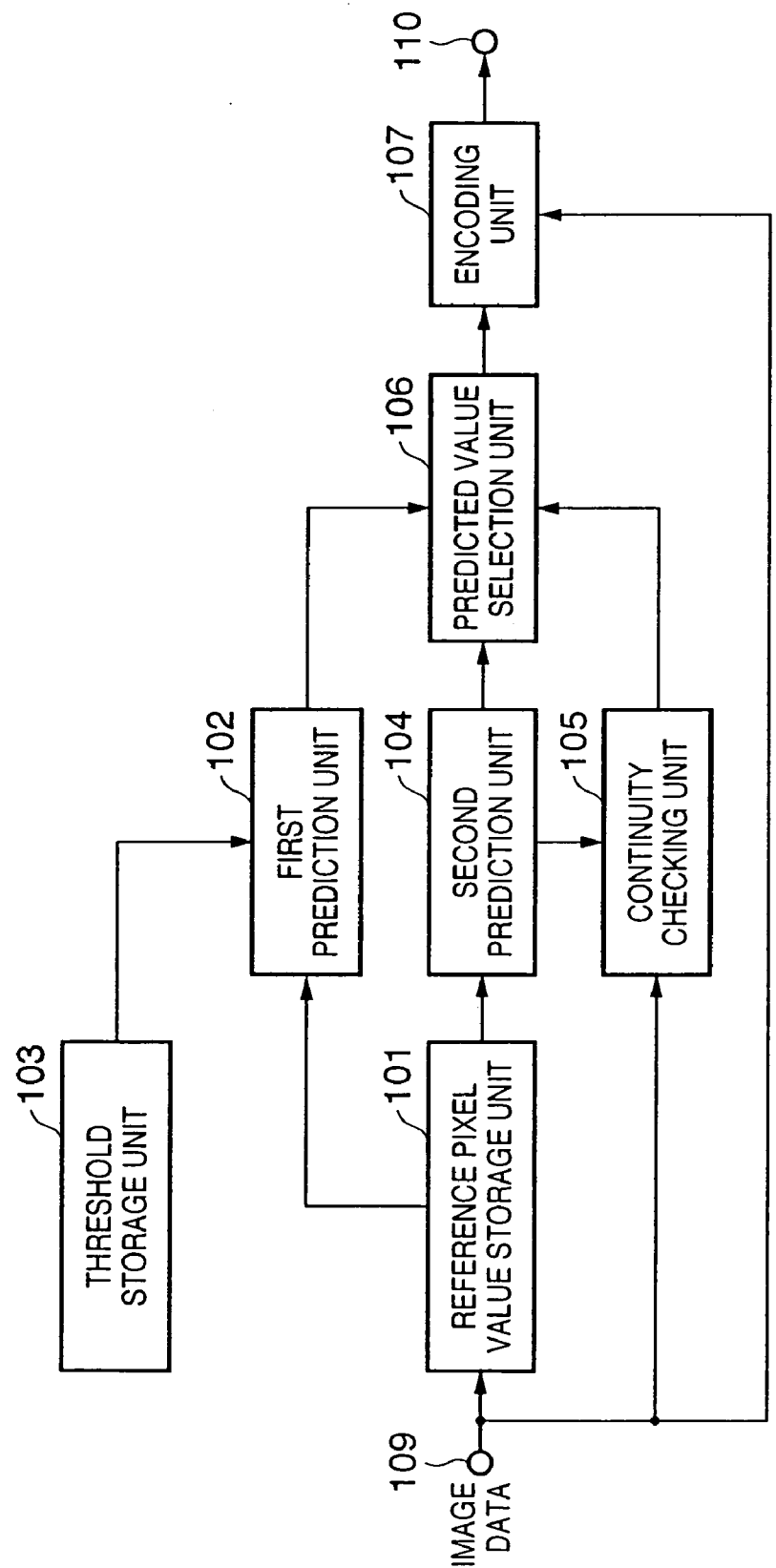
FIG. 1 is a block diagram of an image encoding apparatus in the third embodiment.

Referring to FIG. 1, reference numeral 101 denotes a reference pixel value storage unit (comprising a shift register) which stores pixel data after the dither process, which is input from an input terminal 109, for 8 pixels in the horizontal direction. The number of pixels to be stored is equal to the horizontal size of the dither matrix. Therefore, if a pixel value input from the input terminal 109 is a pixel value of interest, the reference pixel value storage unit 101 stores and holds pixel data one to eight pixels before the pixel value of interest in the chronological sequence.

Reference numeral 103 denotes a threshold storage unit which stores the average values of the dither matrices 301 to 303 shown in FIGS. 3A to 3C. In this embodiment, since the average values of the threshold values of the respective dither matrices are equal to those of the dither matrix 302, the dither matrix 302 alone need only be stored, and the storage capacity can be reduced accordingly. Of course, a plurality of dither matrices may be stored and held, and a calculation unit that calculates their average values may be connected.

Reference numeral 102 denotes a first prediction unit, which reads out a pixel value immediately before the pixel value of interest from the reference pixel value storage unit 101, reads out a threshold value from the threshold storage unit 103, and determines a predicted value (to be referred to as a first predicted value hereinafter) of the pixel of interest on the basis of these values. The first prediction unit 102 is used to improve the prediction precision of a vertical stripe image, which is weak in the conventional method (details will be described later).

Reference numeral 104 denotes a second prediction unit which determines a pixel value eight pixels before the pixel of interest, i.e., an in-phase input pixel value in the dither matrix, as a predicted value (to be referred to as a second predicted value hereinafter).

Reference numeral 105 denotes a continuity checking unit which makes checking required to select one of the first and second predicted values (details will be described later).

Reference numeral 106 denotes a predicted value selection unit which selects and outputs one of the first and second predicted values on the basis of the checking result of the continuity checking unit 105.

Reference numeral 107 denotes an encoding unit which encodes on the basis of the predicted value from the predicted value selection unit 106 and the pixel value of interest.

The operation of the encoding apparatus in this embodiment with the above arrangement will be described below.

Pixel data for one line are input from the input terminal 109. Upon inputting new one line, the following initialization process is executed. Note that initial values in the initialization process need only be equal to those in a decoding process, and are not limited to the following setups.

- The contents of the reference pixel value storage unit 101 are initialized by a pixel value indicating a predetermined value (0 in this embodiment).
- The threshold storage unit 103 stores eight threshold values for the corresponding line in the dither matrix 302. The dither matrix 302 is formed of eight lines, as shown in FIG. 3B. If the line of 4-valued image data to be encoded is defined as the i-th line, the threshold storage unit 103 can store threshold values in the "i mod 8"-th line (the uppermost line of the dither matrix is defined as the 0th line for the sake of convenience). Alternatively, a selector that selects a line designated by "i mod 8" may be arranged.
- A match counter of the encoding unit 107 is initialized to zero.
- Data held by the continuity checking unit 105 is cleared by a predetermined value.

Since an input pixel value is one pixel in a two-dimensional image, it is generally expressed by a two-dimensional coordinate system. However, since this embodiment exemplifies encoding for each line, the pixel value of interest is expressed by a one-dimensional coordinate value. That is, let $D_i$ be the pixel of interest (pixel data after 4-valued conversion).

As described above, upon starting encoding of the line of interest, the reference pixel value storage unit 101 is cleared to zero. Hence, during an input process of a first-pixel $D_0$ to the eighth pixel $D_7$ of the line of interest, the second predicted value output from the second prediction unit 104 is "0". When data $D_i$ of the ninth or subsequent pixel of one line is input, the second prediction unit 104 outputs $D_{i-8}$ eight pixels before that data $D_i$ as a second predicted value.

On the other hand, the first prediction unit 102 reads out a pixel value $D_{i-1}$ immediately before the pixel of interest, reads out two threshold values, i.e., a threshold value $Th_i$ used upon converting the pixel value $D_i$ of interest into 4-valued data, and a threshold value $Th_{i-1}$ used upon converting the pixel value $D_{i-1}$ immediately before the pixel of interest, from the threshold storage unit 103, and calculates the first predicted value of the pixel value of interest.

Note that the threshold values $Th_i$ and $Th_{i-1}$ should be actually expressed by $Th_{(i \bmod 8)}$ and $Th_{((i-1) \bmod 8)}$. However, in this embodiment, the above expressions are used to indicate the relationship between the threshold value of the pixel of interest and that of a pixel immediately before the pixel of interest, for the sake of simplicity. However, if the pixel of interest is the first pixel $D_0$ of the line, since no $Th_{-1}$ is available, $Th_{-1}=0$ or $Th_{-1}=Th_7$ may be set.

The first predicted value in the first prediction unit is determined according to the relationship shown in FIG. 4 in this embodiment. That is, Condition A: When a reference pixel value (a pixel value immediately before the pixel of interest) $D_{i-1}=0$, the first predicted value is unconditionally set to be "0".

Condition B: When $D_{i-1}=1$ or 2, if $Th_i>Th_{i-1}$, the first predicted value is set to be "0". If $Th_i \leq Th_{i-1}$, the first predicted value is set to be "3".

Condition C: When $D_{i-1}=3$, the first predicted value is unconditionally set to be "3".

The reason why the aforementioned conditions are set will be explained below. When the threshold value $Th_i$ at the pixel position of interest is larger than the threshold value $Th_{i-1}$ at the immediately preceding pixel position, i.e., if $Th_i>Th_{i-1}$, the pixel value $D_i$ of interest is more likely to have a value smaller than the immediately preceding pixel value $D_{i-1}$. Conversely, if $Th_i \leq Th_{i-1}$, the pixel value $D_i$ of interest is more likely to have a large value. Condition B above is set for this reason.

When the dither matrices shown in FIGS. 3A to 3C are used, if an image having a nearly constant density (or luminance) (e.g., halftone image data or the like) is input, most of pixels assume values "0" and "3", and the number of pixels that assume values "1" and "2" are limited. More specifically, when the dither matrices shown in FIGS. 3A to 3C are used, the frequencies of occurrence of "0" and "3" are high, but those of "1" and "2" are low. Conditions A and C are set to cope with such situation.

Note that the method of calculating the predicted value of the first prediction unit may adopt the following method of calculating the predicted value with reference to a plurality of neighboring pixels.

Condition A: When all pixel values $(D_{i-1}, D_{i-2}, \ldots, D_{i-n})$ of n neighboring pixels match, that value is set as the first predicted value.

Condition B: When the neighboring pixel values include at least one different pixel value and $Th_i>Th_{i-1}$, the first predicted value is set to be "0".

Condition C: When the neighboring pixel values include at least one different pixel value and $Th_i \leq Th_{i-1}$, the first predicted value is set to be "3".

This is premised on that when a plurality of continuous pixels have the same value, the next pixel is more likely to have the same value (e.g., a blank portion of a document).

This method also has a merit in that condition A is satisfied in many cases, and its determination algorithm can be easily implemented by software as follows.

If n=4, four pixel values $(D_{i-4}, D_{i-3}, D_{i-2}, D_{i-1})$ are coupled (the left side=the most significant bit) and are stored in one register X. Also, four pixel values $(D_{i-3}, D_{i-2}, D_{i-1}, D_i)$ including the pixel of interest are coupled and stored in register Y. The value of register Y can be used as that of register X upon processing the next pixel.

Let Z be the XOR (exclusive OR) of registers X and Y. Then, if the value for the upper 3 pixels of Z is zero, all of $D_{i-4}=D_{i-3}$, $D_{i-3}=D_{i-2}$, and $D_{i-2}=D_{i-1}$ are met, and condition A is satisfied. Furthermore, if Z=0, $D_{i-1}=D_i$ is also met, and the predicted value matches the pixel value of interest.

If the difference between the threshold values of neighboring pixels is large, threshold values may be classified into classes such as large, middle, small, and the like, and the predicted value may be calculated based on the magnitude relationship between classes in place of comparison between the threshold values themselves, thus obtaining substantially the same result. More specifically, a method of classifying threshold values into four classes using the upper 2 bits of the threshold values is available.

In this embodiment, since the first prediction unit uses only the magnitude relationship between the threshold values of neighboring pixels, the threshold storage unit 103 may store comparison results with threshold values with immediately preceding pixels in place of the threshold values themselves.

As described above, the first prediction unit 102 outputs the first predicted value and the second prediction unit 104 outputs the second predicted value. The predicted value selection unit 106 selects one of the first and second predicted values in accordance with the checking result of the continuity checking unit 105, and outputs the selected value as a final predicted value to the encoding unit 107. Hence, the continuity checking unit 105 in this embodiment will be described below.

Figure 36:
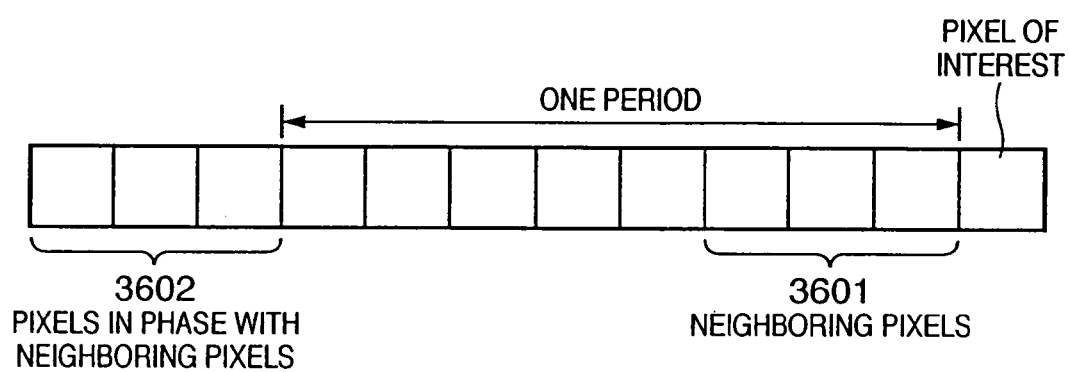
FIG. 36 is a view for explaining the position of a pixel to be referred to by correlation calculation means.
Figure 37:
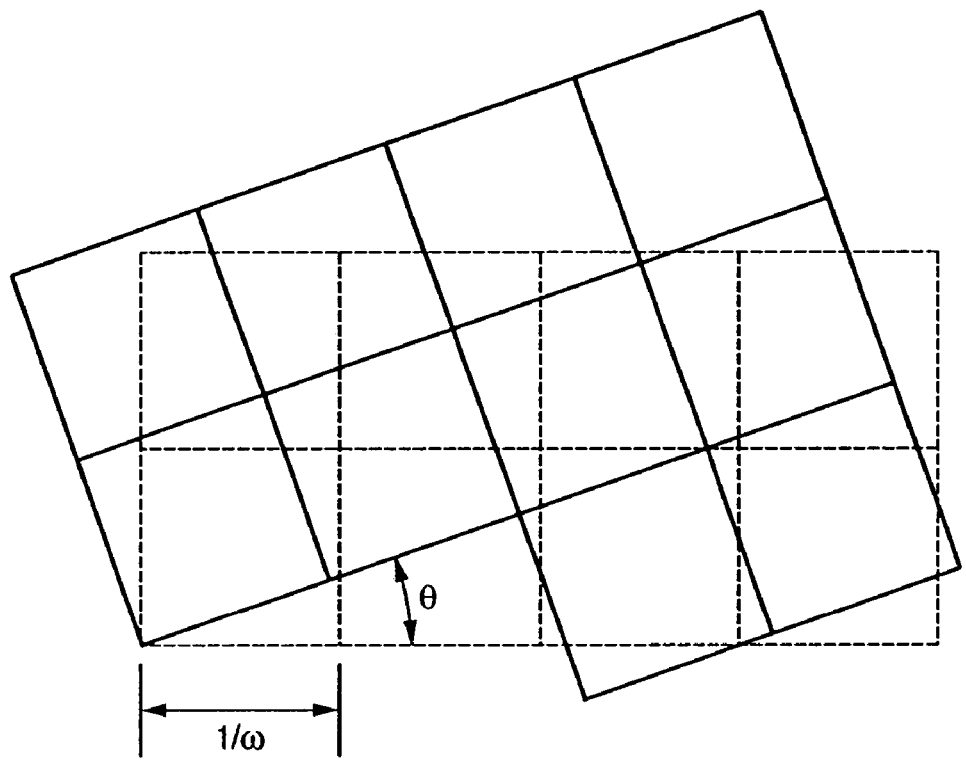
FIG. 37 is a view for explaining the periodicity of threshold values in the fifth embodiment.

The continuity checking unit 105 in this embodiment compares data for nearest three pixels that do not include the pixel of interest, i.e., neighboring pixels 3601 shown in FIG. 36 with data 3601 for three pixels one period before depending on the size of the dither matrix (pixels in phase to the neighboring pixels). In this case, three pixels nearest the pixel of interest are compared with corresponding three pixels one period before. However, the number of pixels to be compared is not particularly limited. Also, the present invention is not limited to pixels one period before but pixels an integer multiple of one period before may be used. However, pixels have lower correlation with increasing distance, and pixels one period before are preferably used.

In this embodiment, when the number of matches is equal to or larger than the number of mismatches upon comparison (when the number of matches is equal to or larger than 2 since two sets of three pixels are compared in this embodiment), it is determined that periodicity due to the dither matrix is conspicuously reflected on the input image, and the second predicted value is to be selected. When the number of matches is smaller than the number of mismatches, it is determined that the first predicted value is to be selected.

Figure 8:
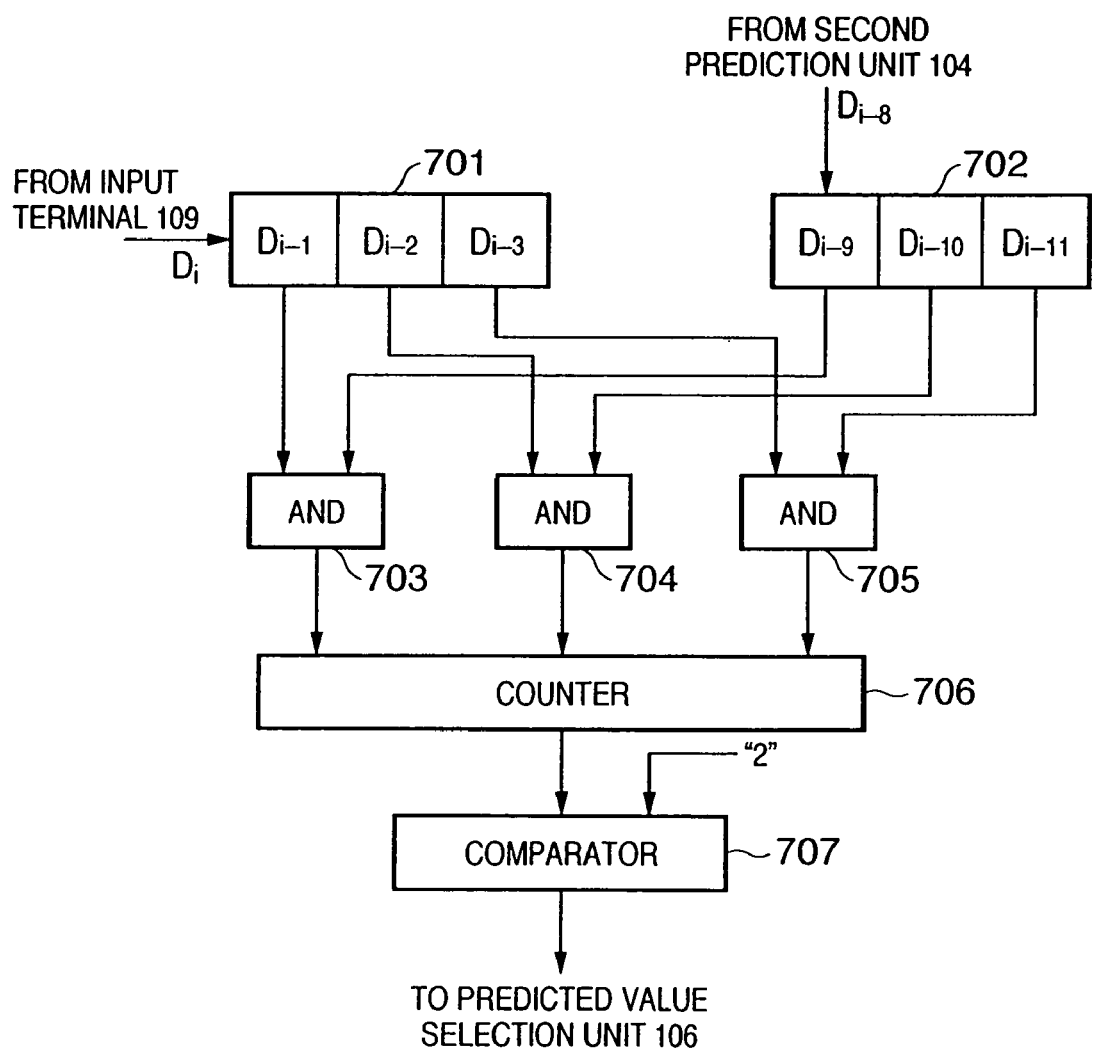
FIG. 8 is a block diagram of a continuity checking unit 105 in the third embodiment.

FIG. 8 shows an example of a practical arrangement of the continuity checking unit 105 in this embodiment.

A shift register 701 stores data $D_{i-1}$, $D_{i-2}$, and $D_{i-3}$ one to three pixels before the pixel $D_i$ of interest, which are input from the input terminal 109. A shift register 702 stores data $D_{i-9}$, $D_{i-10}$, and $D_{i-11}$ eight pixels before.

An AND gate 703 outputs "1" when the pixel data $D_{i-1}$ and $D_{i-9}$ match or "0" when they do not match. The same applies to AND gates 704 and 705.

A counter 706 counts the number of "1"s which are output from the AND gates 703 to 705 and indicate matches. When the count value is equal to or larger than a predetermined threshold value "2", a comparator 707 outputs instruction information for selecting the second predicted value to the predicted value selection unit 106; otherwise, it outputs instruction information for selecting the first predicted value to the predicted value selection unit 106. Note that the counter 706 may comprise a lookup table.

The encoding unit 107 repeats the following processes until the line terminal end is reached.

When the pixel value $D_i$ of interest after the dither process matches the predicted value output from the predicted value selection unit 106, the unit 107 counts up the match counter.

When the pixel value $D_i$ of interest, dither image data, and the predicted value do not match, the unit 107 outputs a code indicating the number of matches in accordance with the value of the match counter, and clears the match counter. The unit 107 outputs a code indicating the difference value.

At the line terminal end, the unit 107 outputs a code indicating the line terminal end (indicating that all differences up to the line terminal end are zero).

The output codes are compressed by a known compression encoding method (e.g., Huffman coding, arithmetic coding, LZ coding, or the like), and the compression result is output as compressed image data. Different code tables may be used may be used depending on the predicted value selected.

Figure 2:
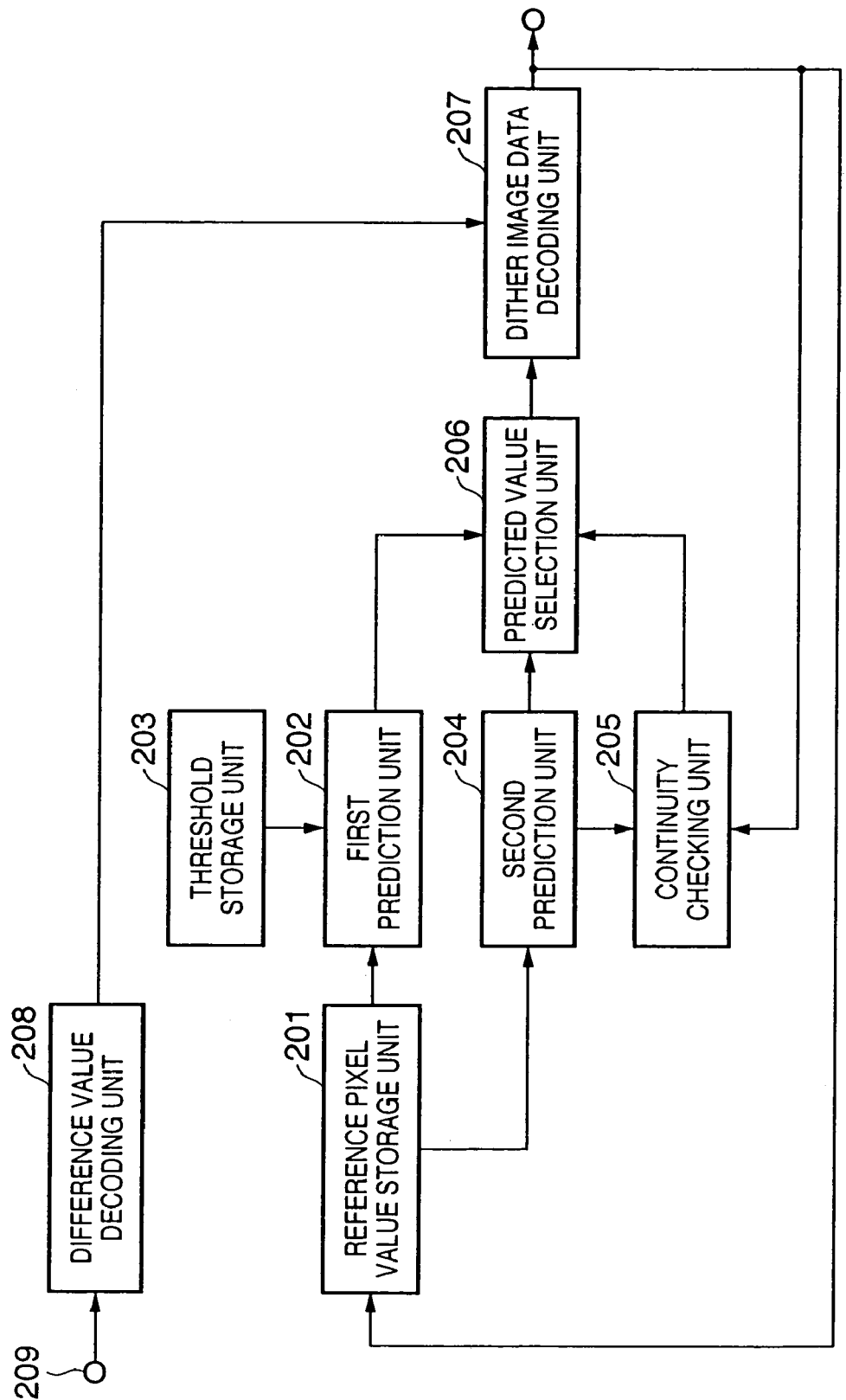
FIG. 2 is a block diagram of an image decoding apparatus in the third embodiment.

FIG. 2 shows the arrangement of a decoding apparatus of this embodiment (an image processing (decoding) apparatus which forms a pair with the image processing (encoding) apparatus in FIG. 1), and the decoding apparatus will be described below.

Note that the decoding apparatus pre-stores dither matrix information shown in FIGS. 3A to 3C. However, when threshold value data of the dither matrices are included in encoded data, they may be decoded to generate the dither matrices. In the following description, assume that the number of pixels that form one line is fixed in advance, or data indicating the number of pixels per line is stored in a header or the like of encoded data.

When encoded data of each line is input from an input terminal 209, the following initialization process is executed in the same manner as the image processing (encoding) apparatus in FIG. 1 at the head of the line.

The contents of a reference pixel value storage unit 202 are initialized by the same initial value (zero in this embodiment) as that of the reference pixel value storage unit 101 on the encoding apparatus side.

A threshold storage unit 203 stores the values of a line corresponding to the line to be processed of dither threshold values.

A match counter of a decoding unit 207 is reset to zero.

Data held by a continuity checking unit 205 are cleared by a predetermined value (in the same manner as in the continuity checking unit of the encoding apparatus).

These initial values may use predetermined values, as described above. In addition, the initial values may be recorded as a part of compressed image data, and initialization may be made in accordance with their contents.

A difference value decoding unit 208 comprises a match counter which counts the number of continuous dither image data that continuously match predicted values. The difference value decoding unit 208 repeats the following processes until it detects a code of the line terminal end.

When the match counter is not zero, the unit 208 counts down the match counter and outputs a difference value 0.

When the match counter is zero, the difference value decoding unit reads the next input code. At this time, when the input code indicates the number of matches, a difference value 0 is output, and a value obtained by subtracting 1 from the number of matches indicated by the code is set in the match counter. If the input code indicates a difference value, that difference value is output. Furthermore, when the code of the line terminal end is detected, a difference value 0 is repetitively output until the control starts the next line process.

With the above sequence, the difference values can be obtained from the compressed image data generated by the encoding unit 107 in FIG. 1.

The dither image data decoding unit 207 decodes dither image data by adding the predicted values selected by the predicted value selection unit 206 and the difference values obtained by the difference value decoding unit 208.

A sequence until the dither image data decoding unit 207 obtains the first output is as follows.

The reference pixel value storage unit 201 is set with the same initial value as that of the reference pixel value storage unit 101 in FIG. 1 by the initialization process.

A second prediction unit 204 calculates a second predicted value by the same method as in the second prediction unit 104 in FIG. 1. Since the contents of the reference pixel value storage unit 201 are pixel values that indicate all "0"s, the first second predicted value is a pixel value "0".

The continuity checking unit 205 makes the same checking process as in the continuity checking unit 105 in FIG. 1. Since the storage contents are set by the initialization process so that the comparison results of the three pixels match, the first checking result selects the second predicted value.

A predicted value selection unit 206 is the same as the predicted value selection unit 106 in FIG. 1. Since the first checking result of the continuity checking unit 205 indicates the second predicted value, and the first second predicted value of the second prediction unit 204 is a blank pixel value, the predicted value selected first by the predicted value selection unit 206 is a pixel value "0".

Since this value is equal to the predicted value selected first by the predicted value selection unit 106, a dither image data pixel value can be decoded from a difference value obtained by the difference value decoding unit 208.

The first dither image data pixel value obtained by the dither image data decoding unit 207 is stored in the reference pixel value storage unit 201. The continuity checking unit 205 makes comparison with the second predicted value, and stores the comparison result. With this arrangement, the storage contents of the reference pixel value storage unit 201 become the same as those of the reference pixel value storage unit 101 in FIG. 1, and the comparison result stored in the continuity checking unit 205 can be updated to the same contents as those of the continuity checking unit 105 in FIG. 1.

Hence, the same predicted values of subsequent pixels as those upon the encoding process can be obtained, and dither image data can be decoded from the difference values.

As described above, according to this embodiment, when a pixel quantized using the dither matrix is more likely to be quantized depending on the periodicity of the dither matrix, data the dither matrix size before the pixel of interest is determined as a predicted value. When a pixel is more likely to be quantized independently of the periodicity of the dither matrix, a predicted value is obtained on the basis of nearest pixel values and a change in threshold value. Therefore, both an image having vertical lines or a vertical line pattern in a direction perpendicular to one line as an encoding unit, and an image such as a halftone image can be encoded at a high compression ratio.

In the above embodiment, a difference between the predicted value and pixel value of interest is encoded. However, the present invention is not limited to this.

For example, the encoding apparatus generates a match/mismatch checking code used to check whether or not the predicted value matches the pixel value of interest first. Only in case of a mismatch, a code of the pixel value of interest is generated to follow that match/mismatch checking code. Upon reception of such codes, when the code indicates a match, the decoding apparatus outputs the predicted value as the pixel value of interest; when the code indicates a mismatch, the apparatus can output a value indicated by the following code as the pixel value of interest.

An example in which the process corresponding to this embodiment is to be implemented by a computer program will be explained below.

Figure 9:
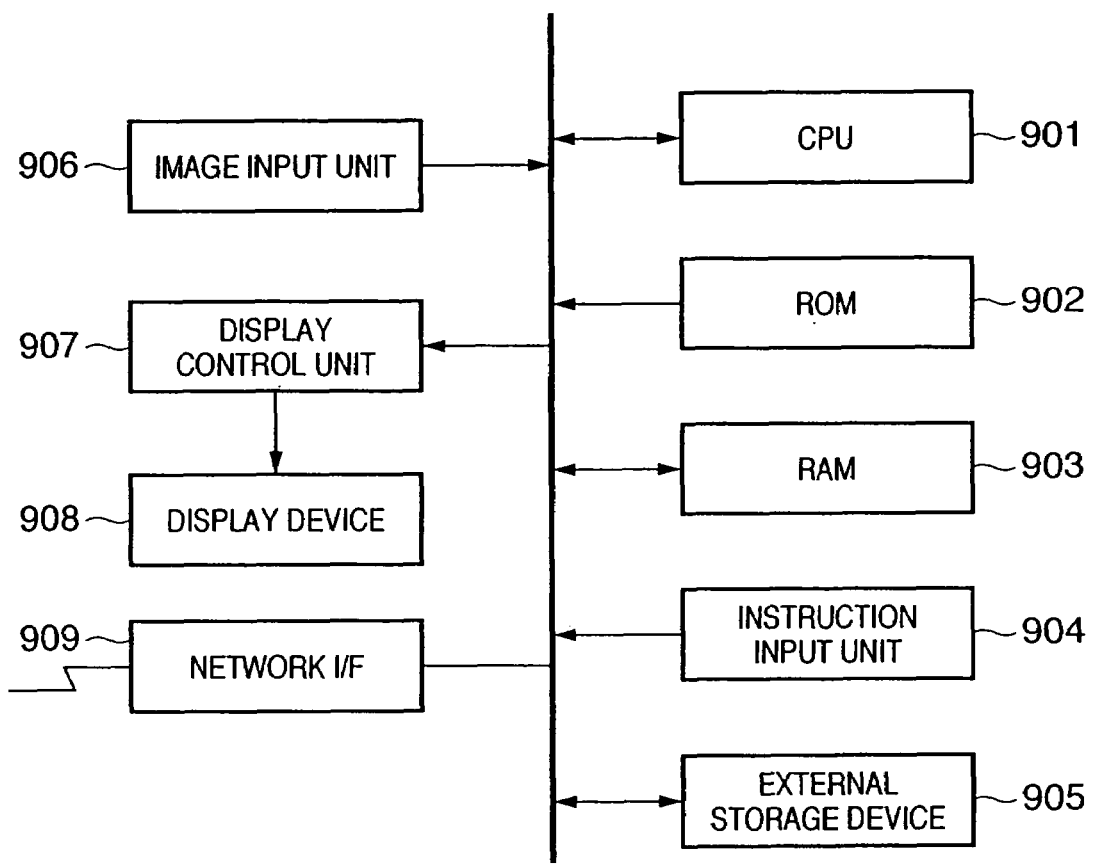
FIG. 9 is a block diagram of an apparatus in the third embodiment.

The apparatus arrangement can be that of a normal personal computer. FIG. 9 shows an example of such arrangement.

Referring to FIG. 9, reference numeral 901 denotes a CPU that controls the overall apparatus; 902, a ROM that stores a BIOS, boot program, and the like; 903, a RAM used as a work area of the CPU 901; and 904, an instruction input unit comprising a keyboard and pointing device. Reference numeral 905 denotes an external storage device such as a hard disk device or the like, which stores a program according to this embodiment. The external storage device 905 is also used to store image data of the processing result. Reference numeral 906 denotes an image input unit such as an image scanner or the like, which inputs image data to be encoded. Reference numeral 907 denotes a display control unit which includes a display memory, a rendering controller on this display memory, and a circuit for outputting data from the display memory to a display device 908 as a video signal. Reference numeral 909 denotes a network interface. Note that the image input unit 906 is not particularly limited as long as it can input image data. For example, a digital camera or an interface that connects it may be used. Also, when image data present on the network is to be encoded, the image input unit 906 itself may be omitted.

With the above arrangement, when the power supply of the apparatus is turned on, the CPU 901 loads an OS from the external storage device 905 onto the RAM 903 in accordance with the boot program of the ROM 902, and executes an image encoding program or decoding program according to the third embodiment, when such program is designated by the instruction input unit 904.

The third embodiment will exemplify compression encoding which is made for respective 8×4 (pixel) blocks. That is, one page is segmented into bands each for four lines, and each band is segmented by 8 pixels from the left end to form blocks.

The processing order in each block is determined, as shown in FIG. 7, so that pixels at neighboring positions are continuously processed. This is to reflect correlation in the vertical direction in the first predicted value or selection of a predicted value.

Figure 5:
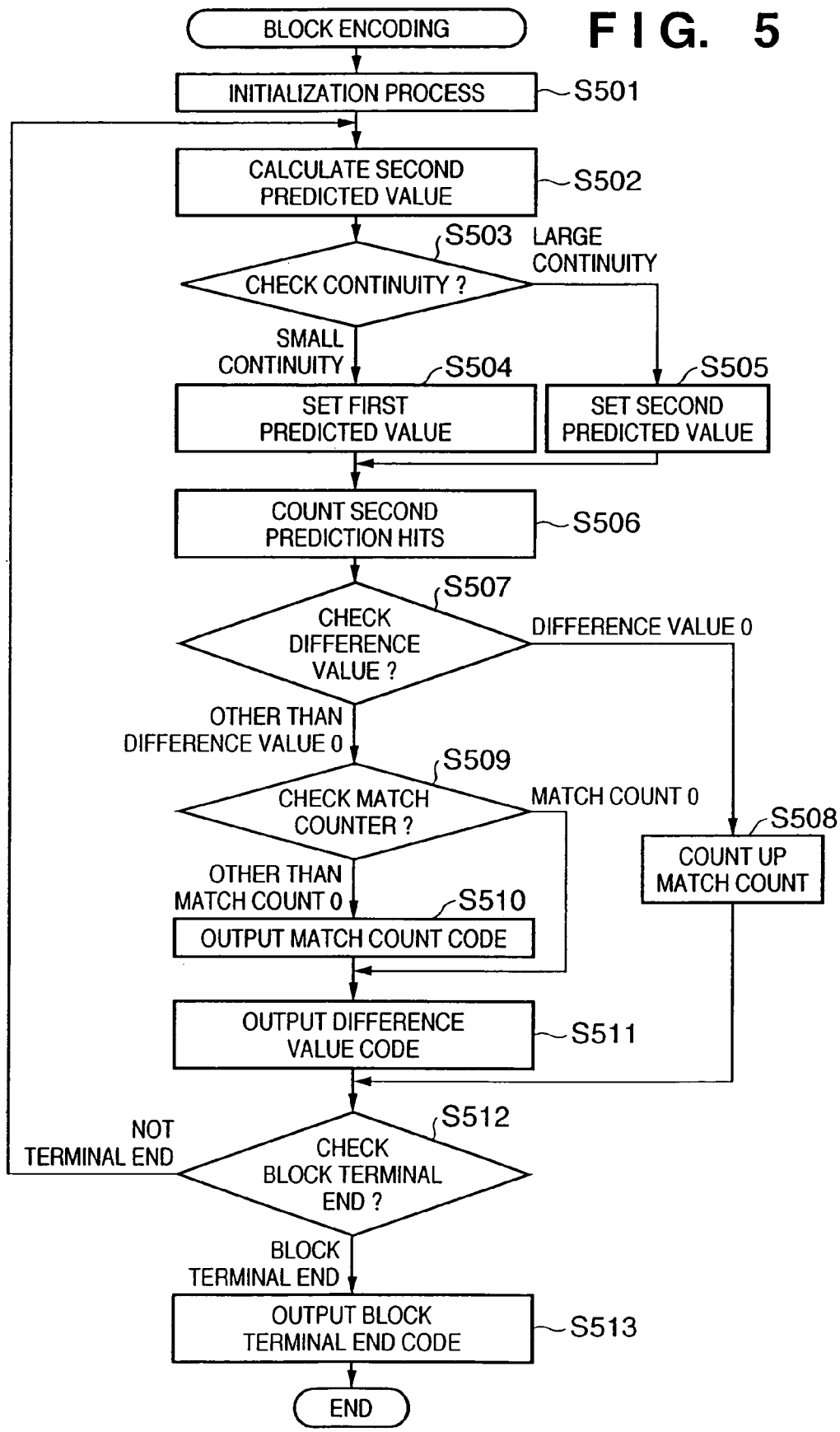
FIG. 5 is a flowchart showing the processing sequence of the image encoding apparatus in the third embodiment.

FIG. 5 is a flowchart showing the processing contents of the encoding processing program for one block.

In an initialization process in step S501, a match counter is cleared, a second prediction hit counter is cleared, and a continuity checking result initial value (large continuity) is set.

A second predicted value calculation process in step S502 calculates a second predicted value to be used later. Assume that the second predicted value is a pixel value in the immediately preceding block (reference block) at the same position as the pixel of interest. In the left end block of each band, a reference block has pixel values of all "0"s.

In step S503, continuity is checked every time four pixels have been processed. If four pixels include two or more zero differences between the second predicted values and dither pixel values to be processed, it is determined that continuity is large; otherwise, it is determined that continuity is small. A prediction method to be used in subsequent four pixels is determined depending on the checking result.

If a break point for four pixels is reached, continuity is checked with reference to the second prediction hit counter, and the counter is then cleared. If the break point for four pixels is not reached, the previous checking result is used intact.

A first predicted value setting process in step S504 is required only when continuity is small. A first predicted value is calculated, and is set as a predicted value of the pixel of interest. The first predicted value is selected from the median of nearest previous three pixels that do not include the pixel of interest. At the beginning of the block, pixels at the end of the reference block are used.

In recent high-resolution image data, a character with a normal stroke count has a width of several to ten odd pixels. The first predicted value of this embodiment aims at simple prediction in such character portion.

A second predicted value setting process in step S505 sets the second predicted value calculated in step S502 (second predicted value calculation process) as a predicted value of the pixel of interest.

A second prediction hit count process in step S506 checks if the second predicted value calculated in step S502 (second predicted value calculation process) matches a dither pixel value of interest. If they match, the second prediction hit counter is counted up.

A difference value checking process in step S507 reads out a dither pixel value of interest in the order shown in FIG. 7. Also, the difference between the predicted value set in the first predicted value setting process (step S504) or the second predicted value setting process (step S505) and the dither pixel value of interest in accordance with large or small continuity, and it is checked if the difference is zero.

A match counter count-up process in step S508 is executed when the difference in the difference value checking process (step S507) is zero, and the match counter that counts successive difference values 0 is counted up.

A match counter checking process in step S509 is executed when the difference in the difference value checking process (step S507) is not zero, and the match counter is checked. If the match counter is not zero, the number of matches of successive difference values 0 of the immediately preceding pixel and pixels before it is not output. Therefore, in order to reflect such number of matches in an output code, a match count code output process is required in step S510.

The match count code output process in step S510 is executed when the difference of the pixel of interest does not become zero after differences 0 continuously occur for one or more pixels, and a code indicating a run of differences 0 is output. A difference value code output process in step S511 outputs a code indicating the difference between the dither pixel value of the pixel of interest and the predicted value.

A block terminal end checking process in step S512 checks if all pixels in the block have been processed. If pixels to be processed still remain, processes after the second predicted value calculation process (step S502) are repeated.

A block terminal end code output process in step S513 outputs a code indicating the block terminal end. The block terminal end code indicates that difference values 0 continuously occur from a given timing of the block to the block terminal end.

Figure 6:
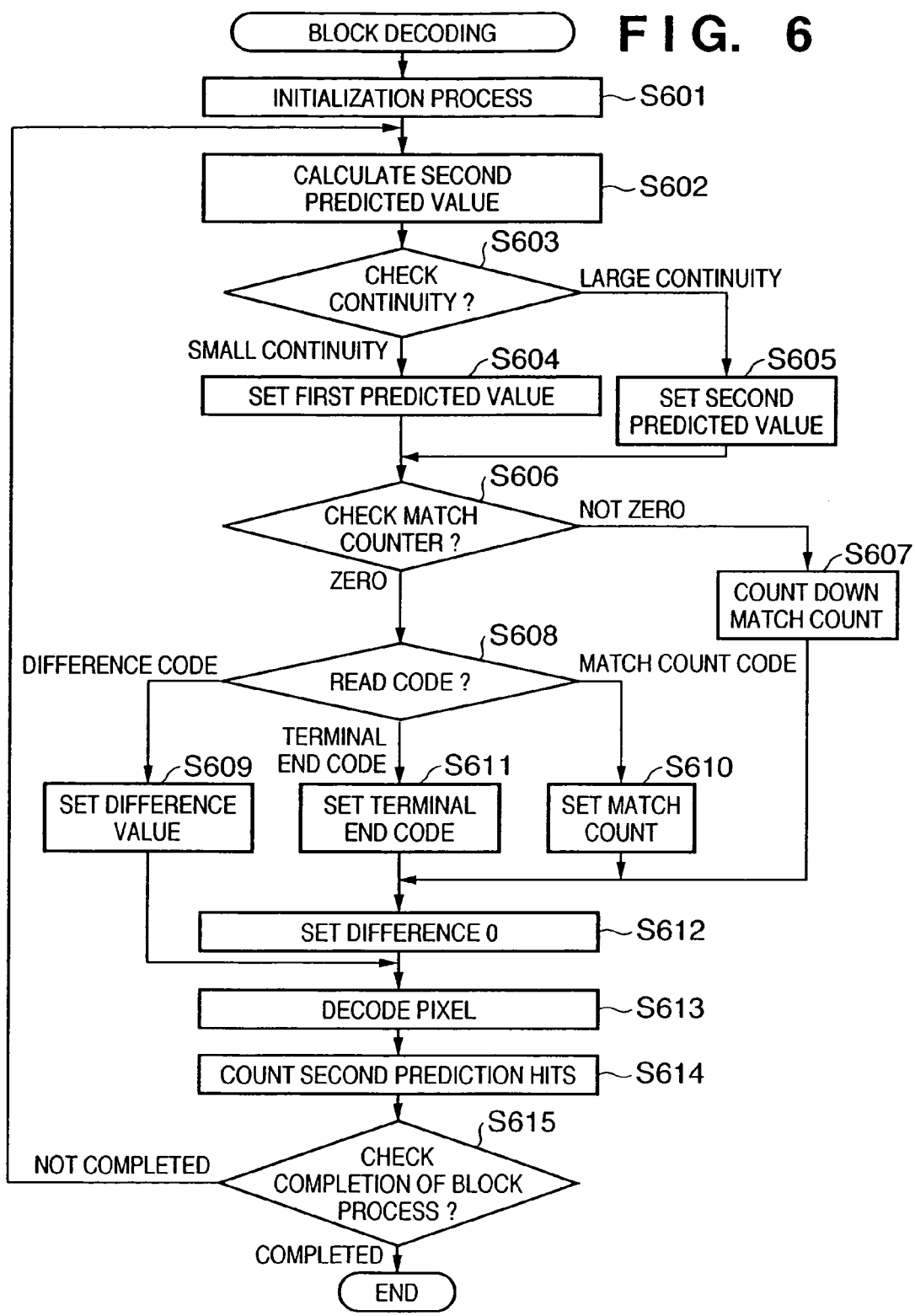
FIG. 6 is a flowchart showing the processing sequence of the image decoding apparatus in the third embodiment.

The decoding process will be described below with reference to the flowchart of FIG. 6. For the sake of easy understanding, this process decodes encoded data which is obtained by the aforementioned encoding process and is acquired via arbitrary means (e.g., a storage medium such as a CD-ROM or the like, reception via a network, and so forth).

An initialization process in step S601 clears the match counter, clears the second hit count counter, and sets a continuity checking result initial value (large continuity).

A second predicted value calculation process in step S602, continuity checking process in step S603, first predicted value setting process in step S604, and second predicted value setting process in step S605 are respectively equivalent to the second predicted value calculation process in step S502, continuity checking process in step S503, first predicted value setting process in step S504, and second predicted value setting process in step S505 shown in FIG. 5.

In a match counter checking process in step S606, the flow branches depending on whether or not the value of the match counter is zero. If the value of the match counter is not zero, this means that the pixel of interest is included in a run of difference values 0 from previous pixels. Hence, the flow advances to step S607 to count down the match counter. This means that one of a run of difference values 0 is used as the difference value of the pixel of interest.

On the other hand, if the value of the match counter is zero, one code word is read in step S608, and the flow branches to one of steps S609 to S611 depending on the contents of the code word.

A difference value setting process (step S609) is executed when a difference value code is read in step S608 (code read process), and a value according to the read code is set to be used as the difference value of the pixel of interest.

A match count setting process (step S610) is executed when a match count code is read in step S608, and a value obtained by subtracting 1 from a runlength of differences 0 indicated by the code is set in the match counter. The reason why 1 is subtracted is that the pixel of interest is included in the runlength indicated by the code.

A terminal end code setting process (step S611) is executed when a block terminal end code is read in step S608, and a value indicating the total number of pixels in a block is set in the match counter. As a result, the process of each pixel in the block does not reach the code read process (step S608), and a difference value 0 is used.

A difference 0 setting process (step S612) sets the difference value of the pixel of interest to be zero in all cases except that the difference code is read.

A pixel decoding process (step S613) decodes a dither pixel value by adding the predicted value set in the first predicted value setting process (step S604) or second predicted value setting process (step S605), and the difference value set in the difference value setting process (step S609) or difference 0 setting process (step S612).

A second prediction hit count process (step S614) compares the dither pixel value decoded in the pixel decoding process (step S613) with the second predicted value calculated in the second predicted value calculation process (step S602), and counts up the second prediction hit counter when they match. The value of the second prediction hit counter is referred to by the continuity checking process (step S603).

A block process end checking process (step S615) checks if all pixels in the block have been processed. If pixels to be processed still remain, processes after the second predicted value calculation process (step S602) are repeated.

As described above, this embodiment can be implemented in an application (or its part) which runs on a general-purpose information processing apparatus such as a personal computer or the like.

As described in the above embodiment, the encoding apparatus generates a match/mismatch checking code used to check whether or not the predicted value matches the pixel value of interest first. Only in case of a mismatch, a code of the pixel value of interest is generated to follow that match/mismatch checking code. Upon reception of such codes, when the code indicates a match, the decoding apparatus outputs the predicted value as the pixel value of interest; when the code indicates a mismatch, the apparatus can output a value indicated by the following code as the pixel value of interest.

To implement such process, in the flowchart (encoding process) in FIG. 5, the pixel value of interest can be output as a code in step S511. Since difference values 0 are counted in step S508, this step is equivalent to the process for counting the number of matches, and need not be changed. In the flowchart of FIG. 6, the predicted value is output as a pixel value of a result in step S612, and the pixel value of a result is directly obtained from a code in step S609. Hence, step S613 can be omitted.

Note that a technique corresponding to the second embodiment can be used in first prediction by the first prediction unit 102 according to the third embodiment. Details of this technique will be described later.

Fourth Embodiment

The fourth embodiment is characterized in that attribute information indicating if a pixel of interest is that of a text/line art region or that of a text/line art region (halftone region) is input for each pixel, and is used to determine a predicted value. In the following description, the text/line art region/non-text/line art region will be simply expressed by text/non-text. This text/non-text can be expressed by 1 bit.

Note that the technique that assigns attribute information such as text/non-text or the like checks image data based on its contour, density, color, and the like, as described in, e.g., Japanese Patent Laid-Open No. 5-56287. In general, in case of a text/line art region, a change in density (or luminance) between neighboring pixels is normally steeper than a predetermined threshold value. This embodiment follows such technique.

Figure 10:
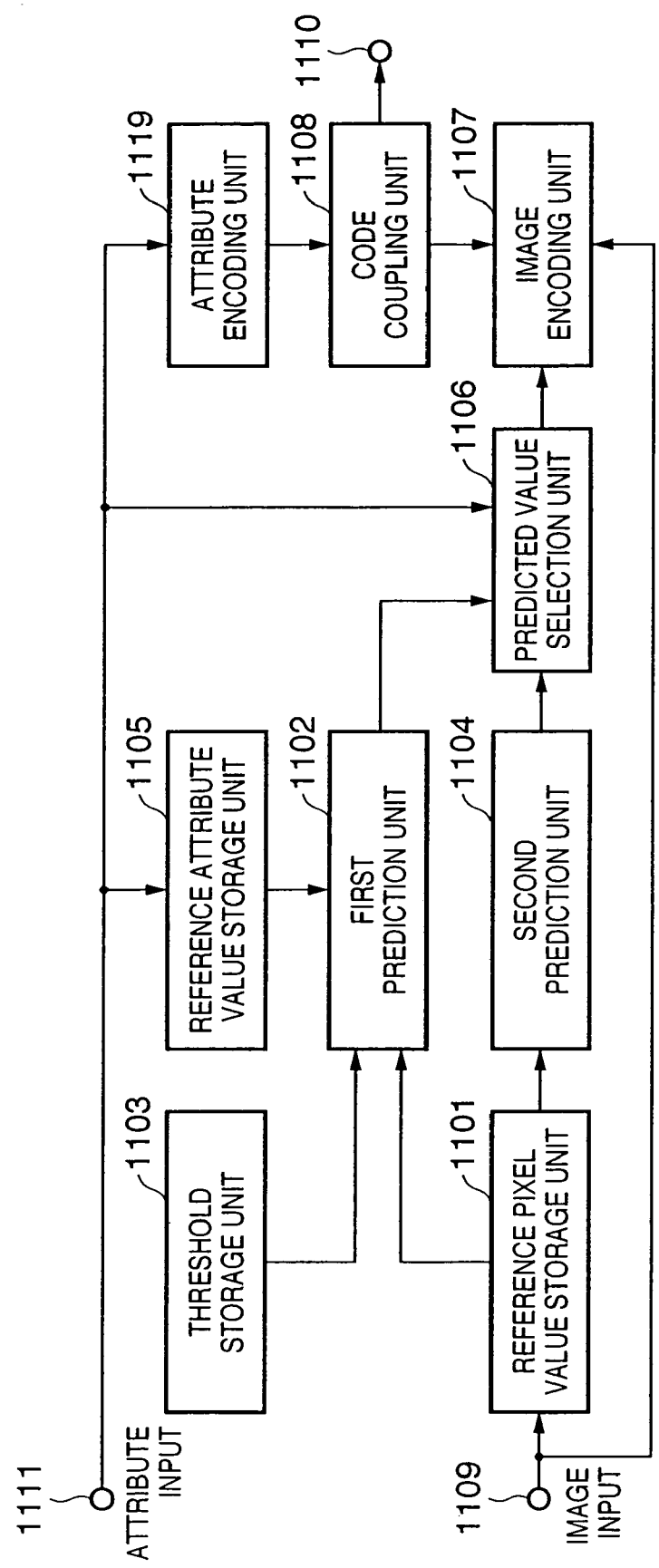
FIG. 10 is a block diagram of an image encoding apparatus in the fourth embodiment.

FIG. 10 is a block diagram of an image encoding apparatus according to this embodiment. Since an input terminal 1109, reference pixel value storage unit 1101, threshold storage unit 1103, and second prediction unit 1104 are the same as the input terminal 109, reference pixel value storage unit 101, threshold storage unit 103, and second prediction unit 104 in FIG. 1, a description thereof will be omitted.

Reference numeral 1111 denotes an input terminal of text/non-text attribute information, which inputs attribute information in synchronism with pixel data input from the image input terminal 1109. A reference attribute value storage unit 1105 temporarily stores a plurality of pieces of attribute information depending on the dither matrix size. Since an image to be encoded in this embodiment has been converted into 4-valued data using the dither matrices shown in FIGS. 3A to 3C, the reference attribute value storage unit 1105 stores attribute information for eight pixels.

In this embodiment as well, an encoding process is done for each line. At the head of each line, an initialization process is executed. Initial values are not limited to the following values as long as the decoding process adopts the same setups. However, in the fourth embodiment as well, the following initial values are set.

The contents of the reference pixel value storage unit 1101 are initialized by pixel values all indicating a predetermined value (0 in this embodiment).

The threshold storage unit 1103 stores values of a line corresponding to the line to be processed of dither threshold values.

The contents of the reference attribute value storage unit 1105 are set with non-text.

A match counter of an encoding unit 1107 is set to be zero.

After that, the respective units execute processes to be described below, thus generating compression-encoded image data.

Dither image data as an input is temporarily saved in the reference pixel value storage unit 1101 that stores data for previous eight pixels (the number of pixels corresponding to the number of columns of the dither matrix) in addition to the pixel of interest. Likewise, attribute values for previous eight pixels are temporarily saved in the reference attribute value storage unit 1105.

The second prediction unit 1104 reads out, from the reference pixel value storage unit 1101, a reference pixel $D_{i-8}$ separated the number of columns of the dither matrix (eight pixels in this embodiment) from a pixel $D_i$ of interest as the current object to be processed, and sets that value as a second predicted value. Since the contents of the reference pixel value storage unit 1101 are pixel values all indicating a predetermined value (0 in this embodiment) by the initialization process, "0" is output as a predicted value for eight pixels from the head of the line.

On the other hand, the first prediction unit 1102 is used to improve the prediction precision of a vertical stripe image, which is weak in the conventional method. The first prediction unit 1102 searches the reference attribute value storage unit 1105 for an attribute indicating "text" by tracing in turn from a pixel immediately before the pixel of interest. If a pixel with a text attribute is found, a pixel value, which is found first and has a text attribute, is read out from the reference pixel value storage unit 1101 as a first predicted reference value.

The first predicted value of the pixel of interest is calculated based on that reference pixel value and threshold values $Th_i$ and $Th_{i-1}$. The conditions required to calculate this first predicted value follow those in FIG. 4. Note that "reference pixel value" in FIG. 4 is a pixel value $D_i$ immediately before the pixel of interest in the third embodiment, but it is a pixel value having the first "text" attribute found by tracing pixels in turn from a pixel immediately before the pixel of interest in this embodiment.

When a retrieval process of the text attribute has failed, i.e., when all attributes stored in the reference attribute value storage unit 1105 are information indicating "non-text", a prescribed value (e.g., a value indicating black) is determined as a first predicted value. Note that "black" is a maximum value "3" when image data in this embodiment is expressed by density components, or it is a minimum value "0" when image data is expressed by luminance components.

An attribute encoding unit 1119 encodes an input attribute value to generate an attribute code. Since an attribute value is expressed by 1 bit (binary value), encoding is done by a conventionally known technique, e.g., MMR (Modified Modified READ) coding used in facsimile and the like.

A predicted value selection unit 1106 selects one of the first and second predicted values in accordance with the attribute value of the pixel of interest, and outputs it as a final predicted value to the image encoding unit 1107. In this embodiment, if the pixel of interest has a text attribute, the first predicted value is selected; if it has a non-text attribute, the second predicted value is selected.

The image encoding unit 1107 generates an image code by encoding a difference between the pixel value of interest as dither image data and the predicted value selected by the predicted value selection unit 1106. In order to compress a difference value 0 (when dither image data matches the predicted value) by runlength coding, the image encoding unit 1107 comprises a match counter that counts a runlength of matches between dither image data and predicted values.

The image encoding unit 1107 is the same as that in the third embodiment. That is, the unit 1107 repeats the following processes until the line terminal end is reached.

When dither image data matches the predicted value, the unit 1107 counts up the match counter.

When dither image data does not match the predicted value, the unit 1107 outputs a code indicating the number of matches in accordance with the value of the match counter, and clears the match counter. The unit 1107 then outputs a code indicating a difference value.

At the line terminal end, the unit 1107 outputs a code indicating the line terminal end (indicating that all differences until the line terminal end are zero).

An output code is compressed by a known compression encoding method (e.g., Huffman coding, arithmetic coding, LZ coding, or the like), and the compression result is output as compressed image data. Different code tables may be used may be used depending on the predicted value selected.

A code coupling unit 1108 couples the attribute code generated by the attribute encoding unit 1119 and the image code generated by the image encoding unit 1107 to obtain an image/attribute code so as to improve convenience in terms of data saving and transfer.

In this embodiment, attribute data is compressed, and is coupled to compressed image data to generate final encoded data. However, since the attribute code has a smaller information size than image data, it may not be compressed. Also, an image code and attribute code may be independently output.

Figure 11:
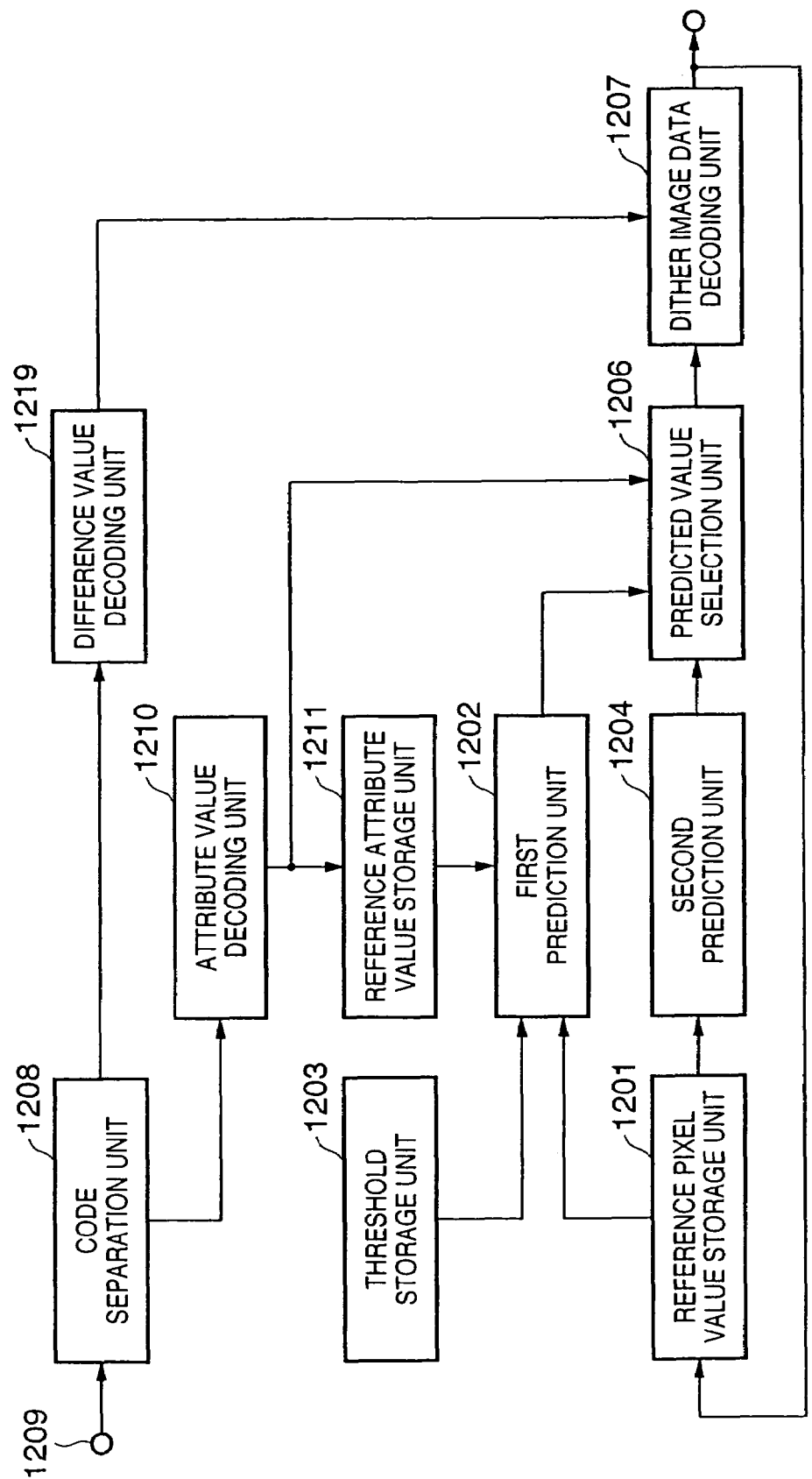
FIG. 11 is a block diagram of an image decoding apparatus in the fourth embodiment.

FIG. 11 shows the arrangement of an image decoding apparatus which forms a pair with the image encoding apparatus in FIG. 10. In this embodiment, the number of pixels that form one line and the dither matrix size are determined in advance. However, these values may be recorded in compressed image data.

The following initialization process is executed in the same manner as the image processing (encoding) apparatus in FIG. 10 at the head of each line.

A reference pixel value storage unit 1201 stores pixel values indicating all-predetermined values (zero in this embodiment) as contents.

A threshold storage unit 1203 stores values of a line corresponding to the line to be processed of dither threshold values.

A match counter of a decoding unit 1207 is reset to zero.

The contents of a reference attribute value storage unit 1210 are set to be "non-text".

These initial values may use predetermined values, as described above. In addition, the initial values may be recorded as a part of compressed image data, and initialization may be made in accordance with their contents.

Encoded data input via an input terminal 1209 is separated into difference code data and attribute code data by a code separation unit 1208.

A difference value decoding unit 1219 obtains a difference value in the following sequence. This difference value decoding unit 1219 has a match counter which counts the number of continuous dither image data that continuously match predicted values. The difference value decoding unit 1219 repeats the following processes until the line terminal end code is detected.

When the match counter is not zero, the unit 1219 counts down the match counter and outputs a difference value 0.

When the match counter is zero, the difference value decoding unit reads the next input code. At this time, when the input code indicates the number of matches, a difference value 0 is output, and a value obtained by subtracting 1 from the number of matches indicated by the code is set in the match counter. If the input code indicates a difference value, that difference value is output.

After the code of the line terminal end is detected, a difference value 0 is repetitively output until the control starts the next line process.

With the above sequence, the difference values can be obtained from the compressed image data generated by the encoding unit 1107 in FIG. 10.

An attribute value decoding unit 1210 obtains an attribute value from an attribute code. An attribute value obtained by the attribute value decoding unit 1210 is temporarily saved in the reference attribute value storage unit 1211.

A dither image data decoding unit 1207 decodes dither image data by adding the predicted value selected by a predicted value selection unit 1206 and the difference value obtained by the difference value decoding unit 1219. A sequence executed until the dither image data decoding unit 1207 obtains the first output will be explained below.

A reference pixel value storage unit 1201 and the reference attribute value storage unit 1211 are set with the same initial values as those of the reference pixel value storage unit 1101 and reference attribute value storage unit 1105 in FIG. 10 by the initialization process.

A second prediction unit 1204 calculates a second predicted value by the same method as in the second prediction unit 1104 in FIG. 10. Since the contents of the reference pixel value storage unit 1201 all indicate predetermined values (zero in this embodiment), the first second predicted value is a pixel value "0".

On the other hand, a first prediction unit 1202 outputs a prescribed value as a first predicted value since the contents of the reference attribute value storage unit 1211 all indicate a non-text attribute.

The predicted value selection unit 1206 is the same as the predicted value selection unit 1106. The unit 1206 selects the first predicted value in case of a text attribute, or it selects a second predicted value in case of a non-text attribute.

Since this value is equal to the predicted value selected first by the predicted value selection unit 1106, a dither image data pixel value can be decoded from a difference value obtained by the difference value decoding unit 1219.

The first dither image data pixel value obtained by the dither image data decoding unit 1207 is stored in the reference pixel value storage unit 1201. With this arrangement, the storage contents of the reference pixel value storage unit 1201 become the same as those of the reference pixel value storage unit 1101 in FIG. 10.

Also, when the contents of the reference attribute value storage unit 1211 are updated in synchronism with the output of the dither image data pixel values, the same contents as in the reference attribute value storage unit 1105 in FIG. 10 can be obtained.

Hence, the same predicted values of subsequent pixels as those upon the encoding process can be obtained, and dither image data can be decoded from the difference values.

As a result of the above process, since a predicted value is determined in accordance with an attribute indicating a text/line art or non-text/line art (halftone image), even when either of a halftone image such as a photo image or the like or a text document image, or an image including both images together is input, encoding can be done in accordance with respective image areas, and the same effect as in the third embodiment described above can be obtained. Especially, in the fourth embodiment, the decoding apparatus can decode data as well as attribute information. For example, when this embodiment is applied to an image forming apparatus such as a printer or the like, print processes respectively suited to text attribute pixels and halftone pixels can be made, thus allowing print processes with high image quality.

In the fourth embodiment as well, a difference between the predicted value and pixel value of interest is encoded. However, as has been explained in the third embodiment, the encoding apparatus generates a match/mismatch checking code used to check whether or not the predicted value matches the pixel value of interest first. Only in case of a mismatch, a code of the pixel value of interest is generated to follow that match/mismatch checking code. Upon reception of such codes, when the code indicates a match, the decoding apparatus outputs the predicted value as the pixel value of interest; when the code indicates a mismatch, the apparatus can output a value indicated by the following code as the pixel value of interest. The same applies to an embodiment to be described below that uses a computer program.

An example in which the fourth embodiment is to be implemented by a computer program will be explained below. The apparatus arrangement is the same as that of the third embodiment shown in FIG. 9, and a description thereof will be omitted. For the sake of easy comparison, in this embodiment, compression is made for respective 8×4 pixel blocks as in the third embodiment. Therefore, one page is segmented into bands each for four lines, and each band is segmented by 8 pixels from the left end to form blocks. The processing order in each block is determined, as shown in FIG. 7, so that pixels at neighboring positions are continuously processed. This is to reflect correlation in the vertical direction in the first predicted value or selection of a predicted value. Encoding for one page is made in the order of upper to lower bands, and in the order of left to right blocks in each band.

Figure 12:
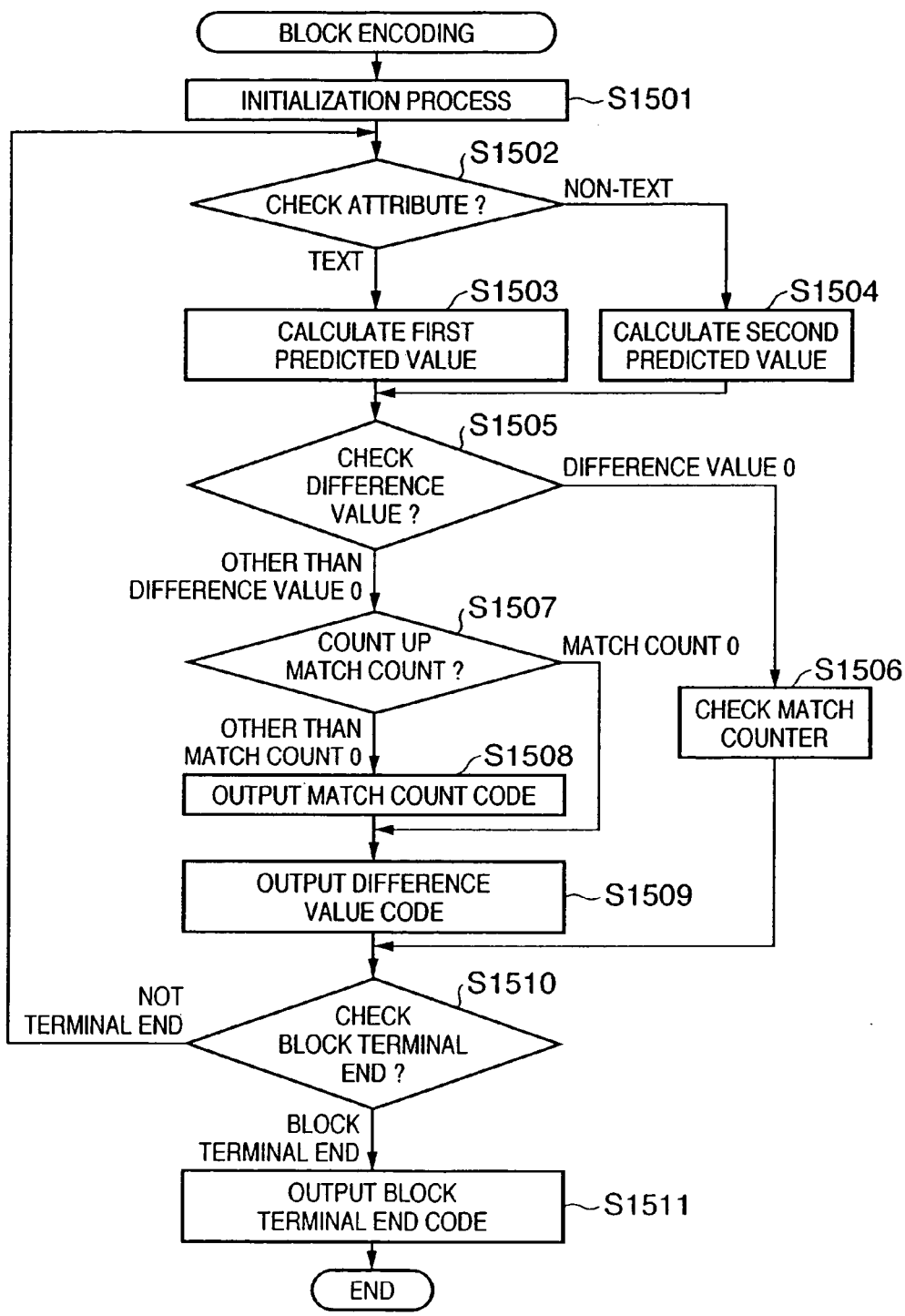
FIG. 12 is a flowchart showing the processing sequence of the image encoding apparatus in the fourth embodiment.

The encoding processing sequence of this embodiment will be described below with reference to the flowchart of FIG. 12.

In an initialization process in step S1501, a match counter is cleared. In step S1502, the attribute of the pixel of interest is checked. This is to determine which of first and second predicted values is to be used.

If the flow advances to step S1503, the first predicted value is calculated. The first predicted value is selected from the median of nearest previous three pixels that do not include the pixel of interest. At the beginning of the block, pixels at the end of the immediately preceding block (to be referred to as a reference block hereinafter) are used. At the left end block in each band, since there is no reference block, a reference block is assumed to have pixel values of all predetermined values (0 in this embodiment).

In recent high-resolution image data, a character with a normal stroke count has a width of several to ten odd pixels. The first predicted value of this embodiment aims at simple prediction in such character portion.

If the flow advances to step S1504, the second predicted value is calculated. The second predicted value is selected from a pixel value at the same relative position as that of the pixel of interest in the reference block.

In step S1505, a dither pixel value to be processed (pixel value of interest) is read out in the order of FIG. 7, a difference from the first or second predicted value is calculated in accordance with the attribute of the pixel of interest, and it is checked if the difference is zero.

If the difference is zero, i.e., if the pixel value of interest matches the predicted value, the flow advances to step S1506 to count up the match counter used to count a runlength of difference values 0 (by incrementing it by "1").

If it is determined in step S1505 that the difference is other than zero, the flow advances to step S1507 to check the match counter.

If the match counter is not zero, this means that the immediately preceding pixel and pixels of difference values 0 that continue before that pixel are merely counted in the match count count-up process (step S1506), but that count is not reflected in an output code. Therefore, a code indicating the runlength of differences 0 is output in step S1508.

In step S1509, a code indicating the difference between the pixel to be processed (pixel of interest) and predicted value is output.

It is checked in step S1510 if the block terminal end is reached, i.e., if all pixels in the block have been processed. If NO in step S1510, processes in step S1502 and subsequent steps are repeated.

On the other hand, if it is determined that one block has been processed, the flow advances to step S1511 to output a code indicating the block terminal end. The block terminal end code indicates that difference values 0 continuously occur from a given timing to the block terminal end of the block.

In the above description, encoding of attribute information has not been explained. However, attribute information is encoded using a known encoding technique such as MMR or the like, as described above.

Figure 13:
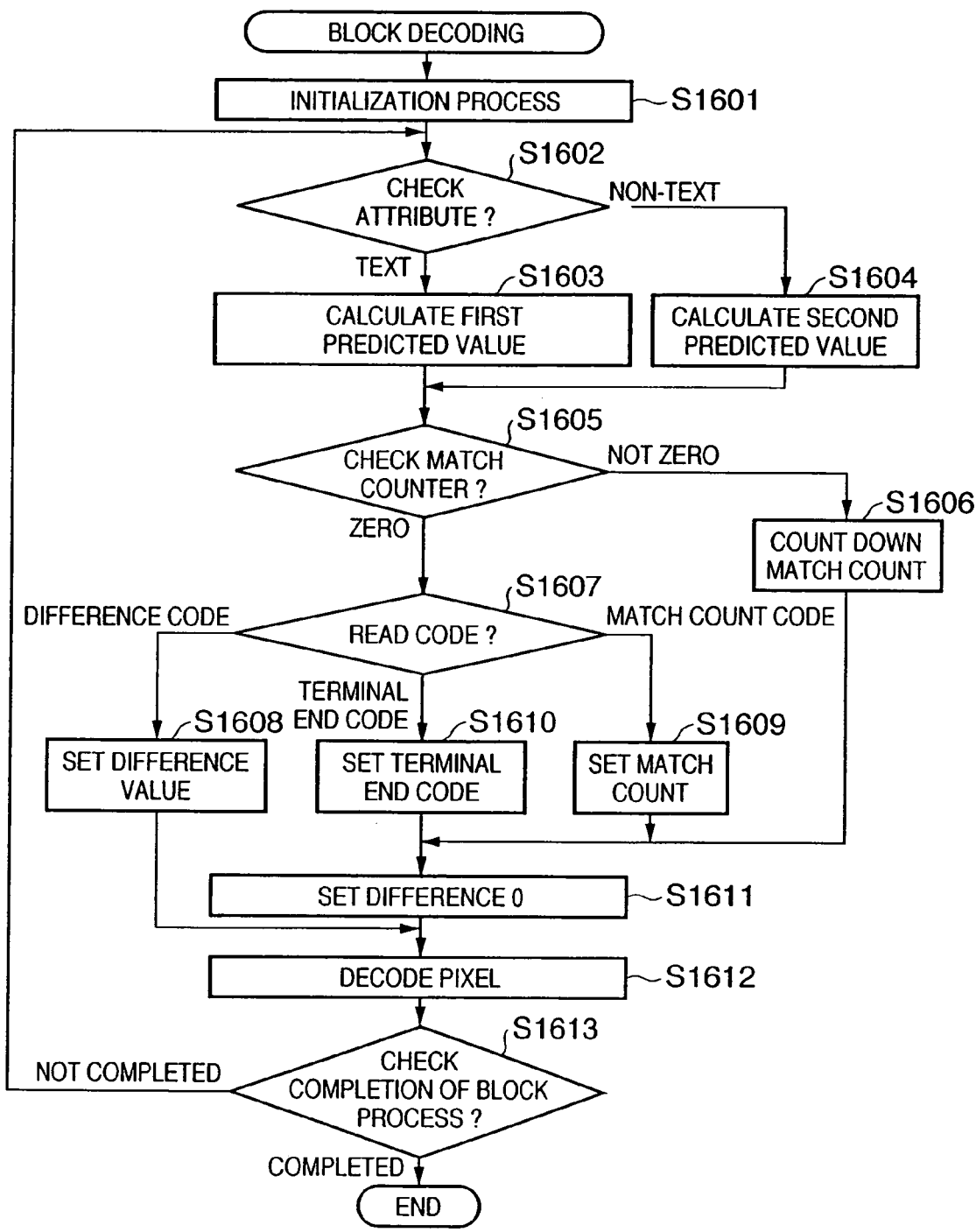
FIG. 13 is a flowchart showing the processing sequence of the image decoding apparatus in the fourth embodiment.

The decoding process will be described below with reference to the flowchart of FIG. 13. Assume that attribute information is decoded using a known decoding technique, and the decoding process of image data will be explained below.

In step S1601, an initialization process (clearing of the match counter and the like) is executed. In step S1602, the attribute of the pixel of interest is checked. If the attribute of the pixel of interest is a text attribute, a first predicted value is calculated in step S1603; if it is a non-text attribute, a second predicted value is calculated in step S1604. These processes in steps S1602 to S1604 are equivalent to those in steps S1502 to S1504 in FIG. 12.

In step S1605, the flow branches depending on whether or not the value of the match counter is zero. If the value of the match counter is not zero, this means that the pixel to be decoded (pixel of interest) is included in a run of difference values 0 from previous pixels. Hence, the match counter is counted down in step S1606, so that one of a run of difference values 0 is used as the difference value of the pixel of interest.

On the other hand, if the match counter is zero, the flow advances to step S1607. In step S1607, one code word is read, and the flow branches depending on the contents of the code word.

A difference value setting process in step S1608 is executed when a difference value code is read in step S1607, and a value according to the read code is set to be used as the difference value of the pixel of interest.

A process in step S1609 is executed when the read code is a match count code, and a value obtained by subtracting 1 from a runlength of differences 0 indicated by the code is set in the match counter. The reason why 1 is subtracted is that the pixel of interest is included in the runlength indicated by the code.

A terminal end code setting process in step S1610 is executed when the read code is a block terminal end code, and a value indicating the total number of pixels in a block is set in the match counter. As a result, the process of each pixel in the block does not reach the code read process (step S1607), and a difference value 0 is used in the process of the remaining pixels in the block.

In step S1611, the difference value of the pixel of interest is set to be zero in all cases except that the difference code is read.

In step S1612, a dither pixel value is decoded by adding the predicted value set in the first predicted value calculation process (step S1603) or second predicted value calculation process (step S1604), and the difference value set in the difference value setting process (step S1608) or difference 0 setting process (step S1611).

It is checked in step S1613 if all pixels in a block have been processed. If NO in step S1613, processes in step S1602 and subsequent steps are repeated.

As described above, in the fourth embodiment as well, dither image data can be compressed/expanded by a relatively simple method. Especially, a great effect for a stripe portion or text portion which is weak in the conventional method can be expected.

In the third and fourth embodiments, 4-valued image data obtained by converting monochrome 256-gray level image data using threshold values that change periodically is to be encoded. However, the present invention is not limited to a monochrome image but may be applied to a color image. When the present invention is applied to a color image, the same process can be applied to each color component. Also, data to be encoded is not limited to 4-valued image data, but may be images of any other numbers of gray levels such as a binary image that is used most frequently.

Furthermore, as has been explained in the above embodiments, the present invention includes a computer program in its scope. In general, a computer program is ready to run after a computer-readable storage medium such as a CD-ROM or the like is set in a computer, and is copied or installed in a system. Hence, such computer-readable storage medium is also included in the scope of the present invention, as a matter of course.

Fifth Embodiment

Modification of Third Embodiment

The fifth embodiment uses a technique corresponding to the second embodiment in first prediction by the first prediction unit 102 in the third embodiment (that is, in order to satisfactorily compress vertical stripe image data equal to the change period of threshold values, two different types of predictions, i.e., prediction that utilizes the period of threshold values, and prediction based on neighboring pixel values of the pixel of interest, are adaptively selected). Hence, please refer to the second and third embodiments as needed for details of respective units. This embodiment is described as an independent embodiment, but it merely specifies that the features of both the second and third embodiments can be provided at the same time. It is very effective to have these features at the same time in terms of implementation.

In this embodiment, parameters θ, ω, and d are determined, and dither threshold value t is calculated based on the number n of gray levels and pixel position (x, y) of input image data using:

$$x' = x \cos\theta - y \sin\theta \quad (1\text{-}1)$$

$$y' = x \sin\theta + y \cos\theta \quad (1\text{-}2)$$

$$a = \sin(2p\omega x') + \sin(2p\omega y') \quad (2)$$

$$t = (a+2) \times (n-2d-3)/4 + d + 3/2 \quad (3)$$

In practice, sin θ and cos θ are expressed by finite bit lengths, and threshold value t is finally calculated as an integer by rounding off a decimal part. Then, threshold value t becomes an integer falling the range from d+1 to n−d−2 (both inclusive).

A threshold comparison unit compares input pixel value p with threshold value t to obtain output pixel value r. In this case, if p<t−d, r=0; if p>t+d, r=2; otherwise, r=1.

First prediction means (corresponding to the first prediction unit 102) has the same arrangement as the predicted value calculation unit 2502 in the second embodiment.

As for second prediction means (corresponding to the second prediction unit 104), the period of threshold values does not generally become an integer. Since arithmetic operations of the finite bit length are made, threshold values may circulate at some future time, but its period is very long and not practical. For this reason, the following approximation is made if necessary.

The threshold value of a given pixel is the same as that of a pixel which is separated cos θ/ω in the horizontal direction and sin θ/ω in the vertical direction or −sin θ/ω in the horizontal direction and cos θ/ω in the vertical direction.

If m and n are integers, an already processed pixel which has Δx and Δy given by:

$$\Delta x = (m \cdot \cos\theta - n \cdot \sin\theta)/\omega$$

$$\Delta y = (m \cdot \sin\theta + n \cdot \cos\theta)/\omega$$

close to integers is selected, and its pixel value is determined as the second predicted value.

If the process is done in the pixel order in FIG. 24A, the already processed pixel satisfies:

Δy<0 or

Δy=0 and Δx<0

When the second predicted value is calculated in this way, the present invention can be applied in the same manner as in the third and fourth embodiments.

The embodiments according to the present invention have been explained. Since the present invention can be implemented by a general-purpose information processing apparatus such as a personal computer or the like, the present invention can include a computer program in its scope. In order to allow a computer to execute a program, a computer-readable storage medium such as a CD-ROM or the like that stores the corresponding computer program is set in the computer, and is copied or installed in its system. Therefore, the scope of the present invention includes such computer-readable storage medium.

As described above, according to the present invention, encoded data of a high compression ratio is generated for a halftone image and a vertical stripe portion or text portion which is weak in the conventional method by a simple process or circuit arrangement, and the encoded data can be decoded by the decoding side using a simple process or circuit arrangement.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priorities from Japanese Patent Application No. 2003-397824 filed on Nov. 27, 2003, Japanese Patent Application No. 2004-114361 filed on Apr. 8, 2004 and Japanese Patent Application No. 2004-257423 filed on Sep. 3, 2004, the entire contents of which are hereby incorporated by reference herein.

What is claimed is:

1. An image encoding apparatus for encoding image data, which is obtained by quantizing the number of gray levels per pixel of multi-valued image data into a smaller number of gray levels using a dither matrix, comprising:
   a first prediction unit, arranged to calculate a predicted value of a pixel of interest with reference to an already-encoded neighboring pixel at a distance less than a predetermined distance which is determined according to the size of the dither matrix;
   a second prediction unit, arranged to calculate, as a predicted value of the pixel of interest, a value of an already-encoded pixel which is separated an integer multiple of the predetermined distance from the pixel of interest;
   a correlation calculation unit, arranged to calculate a correlation value representing degree of correlation between a first pixel group consisting of a predetermined number of already-encoded pixels and a second pixel group consisting of a predetermined number of already-encoded pixels by comparing pixel values belonging to the first pixel group with pixel values belonging to the second pixel group, where the pixels belonging to the first pixel group are at distances less than the predetermined distance from the pixel of interest and the pixels belonging to the second pixel group are separated from the first pixel group by the predetermined distance along to a direction away from the pixel of interest, and in phase with the pixels belonging to the first pixel group;
   a selection unit, arranged to select the predicted value by said second prediction unit when the correlation value calculated by said correlation calculation unit is not less than a predetermined threshold value, and to select the predicted value by said first prediction unit when the correlation value is less than the predetermined threshold value; and
   an encoding unit, arranged to encode a value of the pixel of interest on the basis of the selected predicted value and the value of the pixel of interest.

2. The apparatus according to claim 1, wherein said first prediction unit calculates the predicted value on the basis of a pixel value immediately before the pixel of interest and the magnitude relationship between a threshold value in the dither matrix used upon quantizing the pixel of interest and a threshold value in the dither matrix used upon quantizing an immediately preceding pixel.

3. The apparatus according to claim 1, wherein, when quantized values of first to n-th neighboring pixels before the pixel position of interest are equal to each other, where n is an integer equal to or greater than 2, said first prediction unit determines that value as a predicted value of the pixel of interest, and when the quantized values of first to n-th neighboring pixels before the pixel position of interest include a different value, said first prediction unit determines a predicted value on the basis of a magnitude relationship between a quantization threshold values, in the dither matrix, used when pixel of interest and a pixel immediately before the pixel of interest are quantized.

4. The apparatus according to claim 1, wherein said first prediction unit determines a predicted value of the pixel of interest on the basis of pixel values and density classes of pixels that neighbor the pixel of interest.

5. The apparatus according to claim 1, wherein the quantization process switches a quantization threshold value in accordance with attribute information corresponding to each input pixel.

6. The apparatus according to claim 1, wherein said correlation calculation unit calculates, as a correlation value, the number of matches between pairs:

D-1 and D-p-1
D-2 and D-p-2
:
D-n and D-p-n where D0 is the pixel of interest, D-1, D-2, . . . , D-n are neighboring pixels when the predetermined number of pixels which are located at distances less than the predetermined period from the pixel of interest is defined by n, and D-p-1, D-p-2, . . . , D-p-n are the in-phase pixels when the predetermined period is defined by p.

7. The apparatus according to claim 1, wherein said encoding unit encodes the value of the pixel of interest on the basis of a difference between the predicted value and the value of the pixel of interest.

8. The apparatus according to claim 1, wherein said encoding unit generates a code indicating whether the predicted value and the value of the pixel of interest match or not, and a code indicating the value of the pixel of interest after that code when the two values do not match.

9. An image decoding apparatus for decoding encoded data of image data, which is obtained by quantizing the number of gray levels per pixel of multi-valued image data into a smaller number of gray levels using a dither matrix, comprising:

a first prediction unit, arranged to calculate a predicted value of a pixel of interest with reference to an already-decoded neighboring pixel at a distance less than a predetermined distance which is determined according to the size of the dither matrix;

a second prediction unit, arranged to calculate, as a predicted value of the pixel of interest, a value of an already-decoded pixel which is separated an integer multiple of the predetermined distance from the pixel of interest;

a correlation calculation unit, arranged to calculate a correlation value representing degree of correlation between a first pixel group consisting of a predetermined number of already-decoded pixels and a second pixel group consisting of a predetermined number of already-decoded pixels by comparing pixel values belonged to the first pixel group with pixel values belonged to the second pixel group, where the pixels belonging to the first pixel group are at distances less than the predetermined distance from the pixel of interest and the pixels belonging to the second pixel group are separated from the first pixel group by the predetermined distance along to a direction away from the pixel of interest, and in phase with the pixels belonged to the first pixel group;

a selection unit, arranged to select the predicted value by said second prediction unit when the correlation value calculated by said correlation calculation unit is not less than a predetermined threshold value, and to select the predicted value by said first prediction unit when the correlation value is less than the predetermined threshold value; and a decoding unit, arranged to output a decoded value indicating the pixel of interest on the basis of the selected predicted value and a code.

10. The apparatus according to claim 9, wherein said decoding unit outputs the decoded value indicating the pixel of interest by adding the predicted value and a difference value indicated by the code.

11. The apparatus according to claim 9, wherein when the code is a code which indicates that a pixel value matches the predicted value, said decoding unit outputs the predicted value as the decoded value indicating the pixel of interest, and when the code is a code this indicates that a pixel value does not match the predicted value, said decoding unit outputs a value corresponding to a subsequent code as the decoded value indicating the pixel of interest.

12. A method of controlling an image encoding apparatus for encoding image data, which is obtained by quantizing the number of gray levels per pixel of multi-valued image data into a smaller number of gray levels using a dither matrix, comprising:

a first prediction step of calculating a predicted value of a pixel of interest with reference to an already-encoded neighboring pixel at a distance less than a predetermined distance which is determined according to the size of the dither matrix;

a second prediction step of calculating, as a predicted value of the pixel of interest, a value of an already-encoded pixel which is separated an integer multiple of the predetermined distance from the pixel of interest;

a correlation calculation step of calculating a correlation value representing degree of correlation between a first pixel group consisting of a predetermined number of already-encoded pixels and a second pixel group consisting of a predetermined number of already-encoded pixels by comparing pixel values belonging to the first pixel group with pixel values belonging to the second pixel group, where the pixels belonging to the first pixel group are at distances less than the predetermined distance from the pixel of interest and the pixels belonging to the second pixel group are separated from the first pixel group by the predetermined distance along to a direction away from the pixel of interest, and in phase with the pixels belonged to the first pixel group;

a selection step of selecting the predicted value in the second prediction step, when the correlation value calculated in the correlation calculation step is not less than a predetermined threshold value, and selecting the predicted value in the first prediction step when the correlation value is less than the predetermined threshold value; and an encoding step of encoding a value of the pixel of interest on the basis of the selected predicted value and the value of the pixel of interest.

13. A method of controlling an image decoding apparatus for decoding encoded data of image data, which is obtained by quantizing the number of gray levels per pixel of multi-valued image data into a smaller number of gray levels using a dither matrix, comprising:

a first prediction step of calculating a predicted value of a pixel of interest with reference to an already-decoded neighboring pixel at a distance less than a predetermined distance which is determined according to the size of the dither matrix;

a second prediction step of calculating, as a predicted value of the pixel of interest, a value of an already-decoded pixel which is separated an integer multiple of the predetermined distance from the pixel of interest;

a correlation calculation step of calculating a correlation value representing degree of correlation between a first pixel group consisting of a predetermined number of already-decoded pixels and a second pixel group consisting of a predetermined number of already-decoded pixels by comparing pixel values belonging to the first pixel group with pixel values belonging to the second pixel group, where the pixels belonging to the first pixel group are at distances less than the predetermined distance from the pixel of interest and the pixels belonging to the second pixel group are separated from the first pixel group by the predetermined distance along to a direction away from the pixel of interest, and in phase with the pixels belonged to the first pixel group;

a selection step of selecting the predicted value in the second prediction step when the correlation value calculated in the correlation calculation step is not less than a predetermined threshold value, and selecting the predicted value in the first prediction step when the correlation value is less than the predetermined threshold value; and a decoding step of outputting a decoded value indicating the pixel of interest on the basis of the selected predicted value and a code.

14. A computer-readable medium storing a computer program for making a computer execute processes in respective steps of a control method of claim 12.

15. An image encoding apparatus for encoding multi-valued image data, which is obtained by quantizing the number of gray levels per pixel of multi-valued image data into a smaller number of gray levels using a dither matrix, comprising:

a quantization unit, arranged to calculate a quantized value of a pixel in the multi-valued image data by comparing the value of the pixel with a quantization threshold value in the dither matrix;

a predicted value calculation unit, arranged to determine, when quantized values of first to n-th neighboring and already-encoded pixels before the pixel position of interest are equal to each other, that value as a predicted value of the pixel of interest, where n is equal to or larger than 2, while determining, when the quantized values of first to n-th neighboring and already-encoded pixels before the pixel position of interest include a different value, a predicted value on the basis of a magnitude relationship between quantization threshold values, in the dither matrix, used when the values of the pixel of interest and a value of a pixel immediately before the pixel of interest have been quantized by said quantization unit; and an encoding unit, arranged to encode a value of the pixel of interest on the basis of the predicted value and the value of the pixel of interest.

16. The apparatus according to claim 15, wherein the quantization process is a binarization unit that uses a dither matrix having dither threshold values.

17. The apparatus according to claim 15, wherein the quantization process switches a quantization threshold value in accordance with attribute information corresponding to each input pixel.

18. A method of controlling an image encoding multi-valued apparatus for encoding image data, which is obtained by quantizing the number of gray levels per pixel of multi-valued image data into a smaller number of gray levels using a dither matrix, comprising:

a quantization process step of calculating a quantized value of a pixel in the multi-value image data by comparing a value of the pixel with a quantization threshold value in the dither matrix;

a predicted value calculation step of determining, when quantized values of first to n-th neighboring and already-encoded pixels before the pixel position of interest are equal to each other, that value as a predicted value of the pixel of interest, where n is equal to or larger than 2, while determining, when the quantized values of first to n-th neighboring and already-encoded pixels before the pixel position of interest include a different value, a predicted value on the basis of a magnitude relationship between quantization threshold values, in the dither matrix, used when the values of the pixel of interest and a value of a pixel immediately before the pixel of interest have been quantized in said quantization step; and a prediction error generation step of generating prediction error data indicating whether or not the quantized value of the pixel of interest processed in the quantization process step matches the predicted value at the pixel position of interest calculated in the predicted value calculation step, wherein the prediction error data generated in the prediction error generation step is determined as data to be encoded.

19. A computer-readable mediums storing a computer program serving as an image processing apparatus for executing a quantization process of multi-valued image data, and compression-encoding the quantization process result, said program serving as:

a quantization process unit, arranged to calculate a quantized value of a pixel in the multi-image data by comparing value of the pixel with a quantization threshold value in the dither matrix;

a predicted value calculation unit, arranged to calculate a predicted value of a quantized value of a pixel of interest on the basis of quantized values of first to n-th quantized values before the pixel position of interest, quantization threshold values, in the dither matrix, used when the values of the pixel of interest and a value of a pixel immediately before the pixel of interest have been quantized, where n is equal to or larger than 2; and a prediction error generation unit, arranged to generate prediction error data indicating whether or not the quantized value of the pixel of interest processed in the quantization process step matches the predicted value at the pixel position of interest calculated in the predicted value calculation step, wherein the prediction error data generated by said prediction error generation unit is determined as data to be encoded.

20. An image processing apparatus for decoding image data compression-encoded by means of an apparatus of claim 15, comprising:

a decoding unit, arranged to decode data to prediction error data indicating whether or not data after a quantization process matches a predicted value;

a predicted value calculation unit, arranged to determine, when quantized values of first to n-th neighboring and already-decoded pixels before the pixel position of interest are equal to each other, that value as a predicted value of the pixel of interest, where n is equal to or larger than 2, while determining, when the quantized values of first to n-th neighboring and already-decoded pixels before the pixel position of interest include a different value, a predicted value on the basis of a magnitude relationship between a quantization threshold value of the pixel of interest and quantization threshold values, in a dither matrix which is the same dither matrix used by the apparatus of claim 15, used when the value of the pixel of interest and a value of a pixel immediately before the pixel of interest have been quantized;

a determination unit, arranged to determine whether or not the prediction error data of the pixel of interest obtained by said decoding unit matches the predicted value of the pixel of interest calculated by said predicted value calculation unit; and a generation unit, arranged to generate a quantized value of the pixel of interest on the basis of the determination result of said determination unit.

21. A method of controlling an image processing apparatus for decoding image data compression-encoded by means of an apparatus of claim 15, comprising:

a decoding step of decoding data to prediction error data indicating whether or not data after a quantization process matches a predicted value;

a predicted value calculation step of determining, when quantized values of first to n-th neighboring and already-decoded pixels before the pixel position of interest are equal to each other, that value as a predicted value of the pixel of interest, where n is equal to or larger than 2, while determining, when the quantized values of first to n-th neighboring and already-decoded pixels before the pixel position of interest include a different value, a predicted value on the basis of a magnitude relationship between quantization threshold values, in a dither matrix which is the same dither matrix used by the apparatus of claim 15, used when the value of the pixel of interest and a value of a pixel immediately before the pixel of interest have been quantized;

a determination step of determining whether or not the prediction error data of the pixel of interest obtained in the decoding step matches the predicted value of the pixel of interest calculated in the predicted value calculation step; and a generation step of generating a quantized value of the pixel of interest on the basis of the determination result in the determination step.

22. A computer-readable medium storing a computer program serving as an image processing apparatus for decoding image data compression-encoded by means of an apparatus of claim 15, said program serving as:

a decoding unit, arranged to decode data to prediction error data indicating whether or not data after a quantization process matches a predicted value;

a predicted value calculation unit, arranged to calculate a predicted value of a quantized value of a pixel of interest on the basis of quantized values of first to n-th quantized values before the pixel position of interest, a quantization threshold value used in the quantization process of the pixel of interest, and quantization threshold values, in a dither matrix which is the same dither matrix used by the apparatus of claim 15, used when the value of the pixel of interest and a value of a pixel immediately before the pixel of interest have quantized, where n is equal to or larger than 2;

a determination unit, arranged to determine whether or not the prediction error data of the pixel of interest obtained by said decoding unit matches the predicted value of the pixel of interest calculated by said predicted value calculation unit; and a generation unit, arranged to generate a quantized value of the pixel of interest on the basis of the determination result of said determination unit.

* * * * *